(12) United States Patent
Park et al.

(10) Patent No.: US 10,962,228 B2
(45) Date of Patent: Mar. 30, 2021

(54) OVEN AND OVEN DOOR OPENING AND CLOSING METHOD

(71) Applicant: SAMSUNG ELECTRONICS CO., LTD., Suwon-si (KR)

(72) Inventors: Sang Jun Park, Yongin-si (KR); Han Jun Sung, Seoul (KR); Jun Hwa Lee, Suwon-si (KR); Hyeong Jin Jang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 291 days.

(21) Appl. No.: 15/775,916

(22) PCT Filed: Nov. 7, 2016

(86) PCT No.: PCT/KR2016/012743
§ 371 (c)(1),
(2) Date: May 14, 2018

(87) PCT Pub. No.: WO2017/082603
PCT Pub. Date: May 18, 2017

(65) Prior Publication Data
US 2018/0372326 A1 Dec. 27, 2018

(30) Foreign Application Priority Data
Nov. 12, 2015 (KR) .................. 10-2015-0159161

(51) Int. Cl.
*F24C 3/12* (2006.01)
*F24C 7/08* (2006.01)
(Continued)

(52) U.S. Cl.
CPC .............. *F24C 3/128* (2013.01); *F24C 7/085* (2013.01); *F27B 5/18* (2013.01); *F27D 21/02* (2013.01);
(Continued)

(58) Field of Classification Search
CPC .. F27B 5/18; F24C 3/126; F24C 3/128; F24C 7/08; F24C 7/082; F24C 7/085;
(Continued)

(56) References Cited

U.S. PATENT DOCUMENTS

2011/0139772 A1* 6/2011 Darney ............... E05B 47/0002
219/702

FOREIGN PATENT DOCUMENTS

CN 1161772 10/1997
CN 1517597 8/2004
(Continued)

OTHER PUBLICATIONS

Machine Translation of DE 10-2007048834 (Year: 2008).*
(Continued)

*Primary Examiner* — Christopher J Besler
*Assistant Examiner* — Christine Bersabal
(74) *Attorney, Agent, or Firm* — Staas & Halsey LLP

(57) ABSTRACT

Provided herein are an oven and a method of opening or closing the door. In more detail, disclosed herein are an oven having a door opening or closing unit capable of opening or closing a door driven by remote control and a method of opening or closing the door of the oven. Some of embodiments provide an oven capable of opening or closing a door by using a door opening or closing unit according to remote control and a method of opening or closing the door of the oven.

18 Claims, 25 Drawing Sheets

(51) Int. Cl.
  *H04M 1/725* (2006.01)
  *F27B 5/18* (2006.01)
  *F27D 21/02* (2006.01)
  *F24C 15/00* (2006.01)
  *F24C 15/04* (2006.01)
  *F27D 19/00* (2006.01)

(52) U.S. Cl.
  CPC ....... *H04M 1/725* (2013.01); *H04M 1/72533* (2013.01); *F24C 15/008* (2013.01); *F24C 15/04* (2013.01); *F27D 2019/0084* (2013.01); *F27D 2021/026* (2013.01)

(58) Field of Classification Search
  CPC ........ F24C 15/04; F24C 15/008; F27D 21/02; F27D 2019/0084; F27D 2021/026; H04M 1/725; H04M 1/72533; H04B 10/116; H04L 12/2825; H04L 2012/285; H04L 2012/2841; A21B 7/00; A47J 27/62; A47J 37/0629
  See application file for complete search history.

(56) References Cited

FOREIGN PATENT DOCUMENTS

| | | |
|---|---|---|
| CN | 101502171 | 8/2009 |
| DE | 10 2007 048 834 A1 | 4/2008 |
| DE | 102007048834 A1 * | 4/2008 ............. F24C 7/087 |
| EP | 2 784 398 A2 | 10/2014 |
| EP | 2 784 398 A3 | 2/2015 |
| KR | 10-2006-0088747 | 8/2006 |
| KR | 10-2011-0054976 | 5/2011 |
| KR | 10-2014-0039733 | 4/2014 |
| KR | 10-2015-0083542 | 7/2015 |

OTHER PUBLICATIONS

International Search Report dated Feb. 1, 2017 in corresponding International Patent Application No. PCT/KR2016/012743, 5 pages.
Written Opinion of the International Searching Authority dated Feb. 1, 2017 in corresponding International Patent Application No. PCT/KR2016/012743, 8 pages.
Chinese Office Action dated Apr. 1, 2019 in corresponding Chinese Patent Application No. 201680065771.6 (9 pages).
Extended European Search Report dated Oct. 11, 2018 from European Patent Application No. 16864529.9, 8 pages.
Chinese Office Action dated Nov. 18, 2019 in corresponding Chinese Patent Application No. 201680065771.6 (16 pages).
European Office Action dated Apr. 9, 2020 from European Patent Application No. 16864529.9, 4 pages.
Chinese Office Action dated Mar. 23, 2020 from Chinese Patent Application No. 201680065771.6, 15 pages.
Chinese Office Action dated Sep. 28, 2020 in Chinese Patent Application No. 201680065771.6.

* cited by examiner

[Fig. 18]
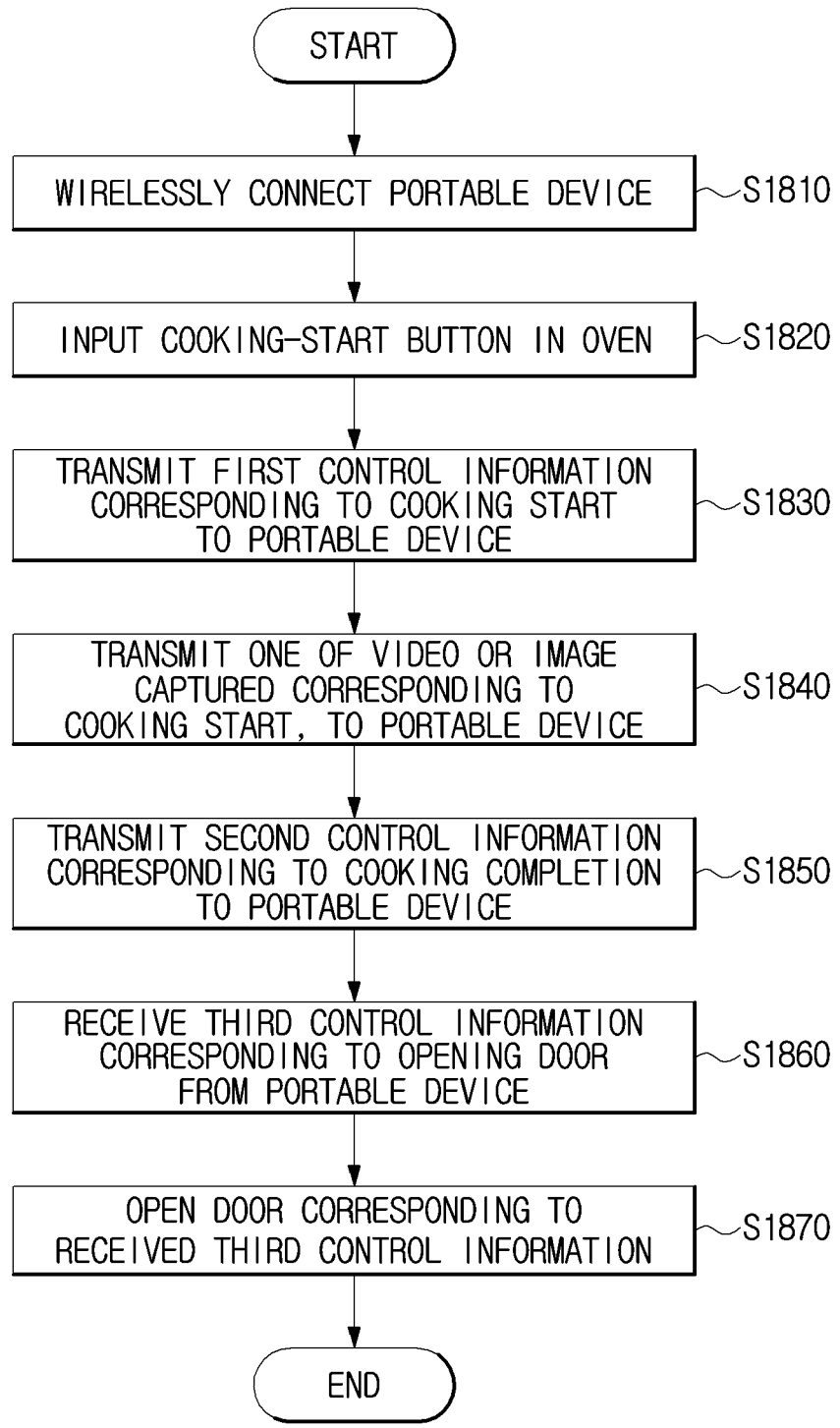

[Fig. 19]
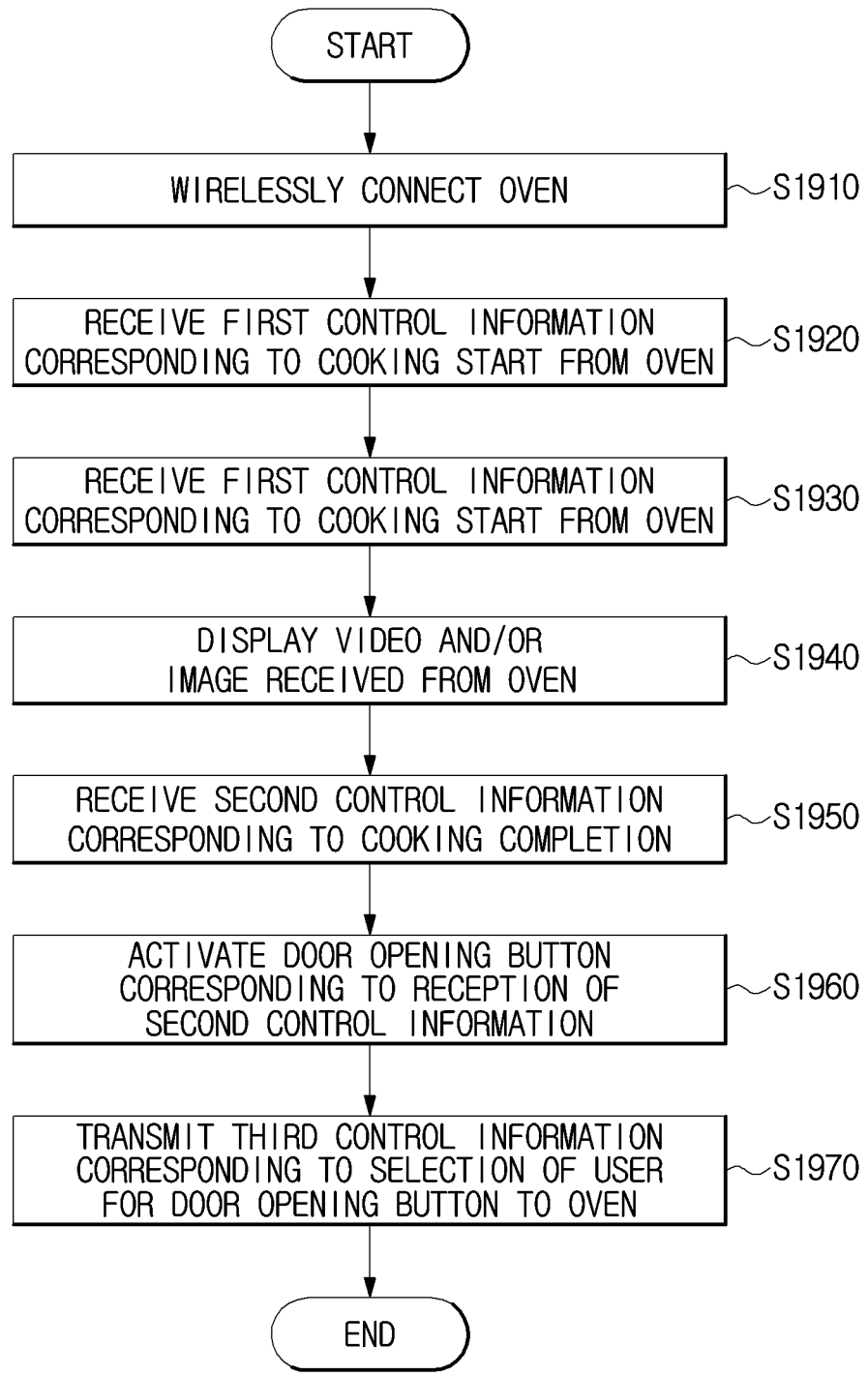

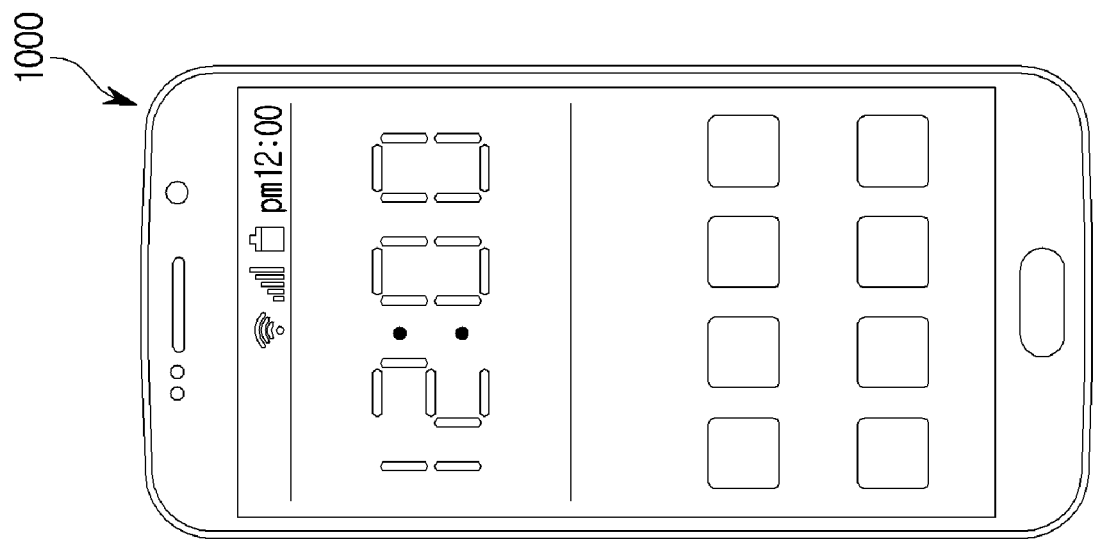
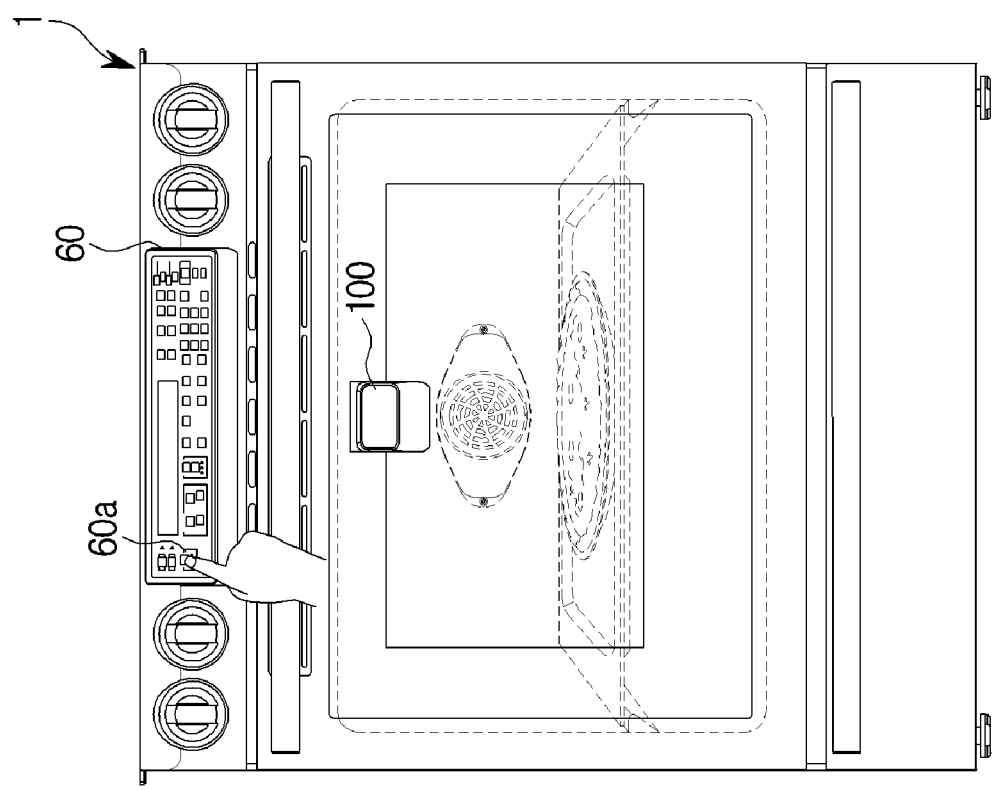
FIG. 20a

FIG. 20e
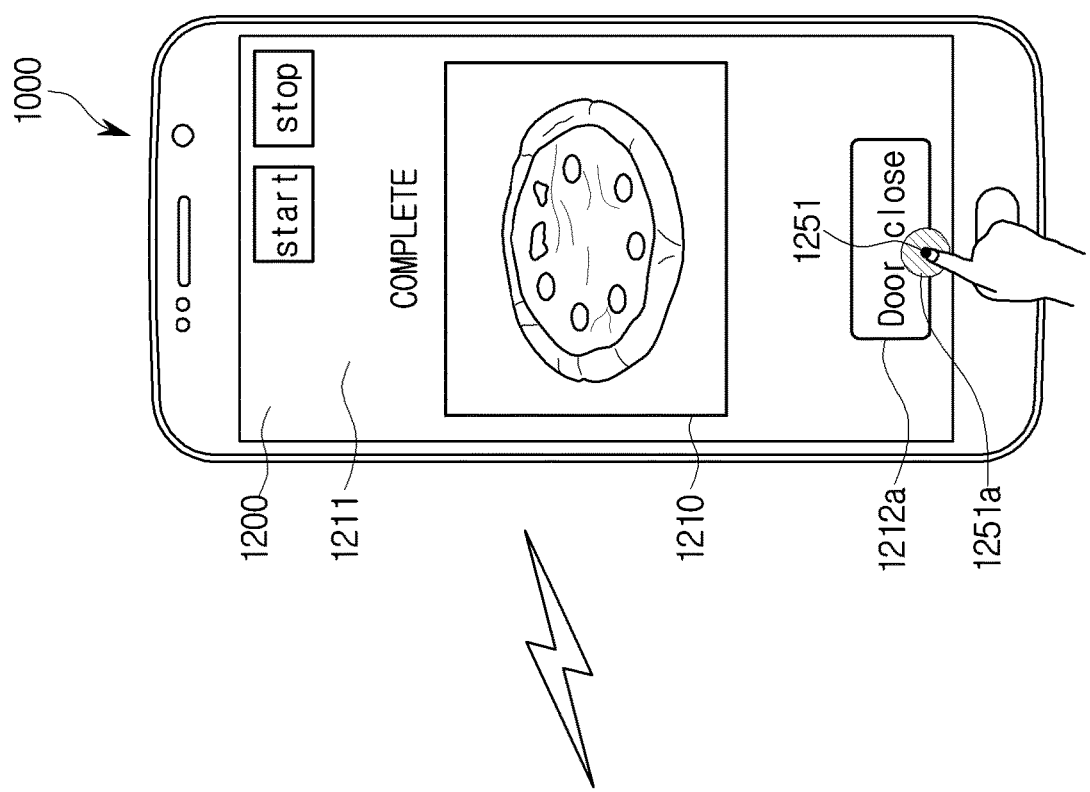
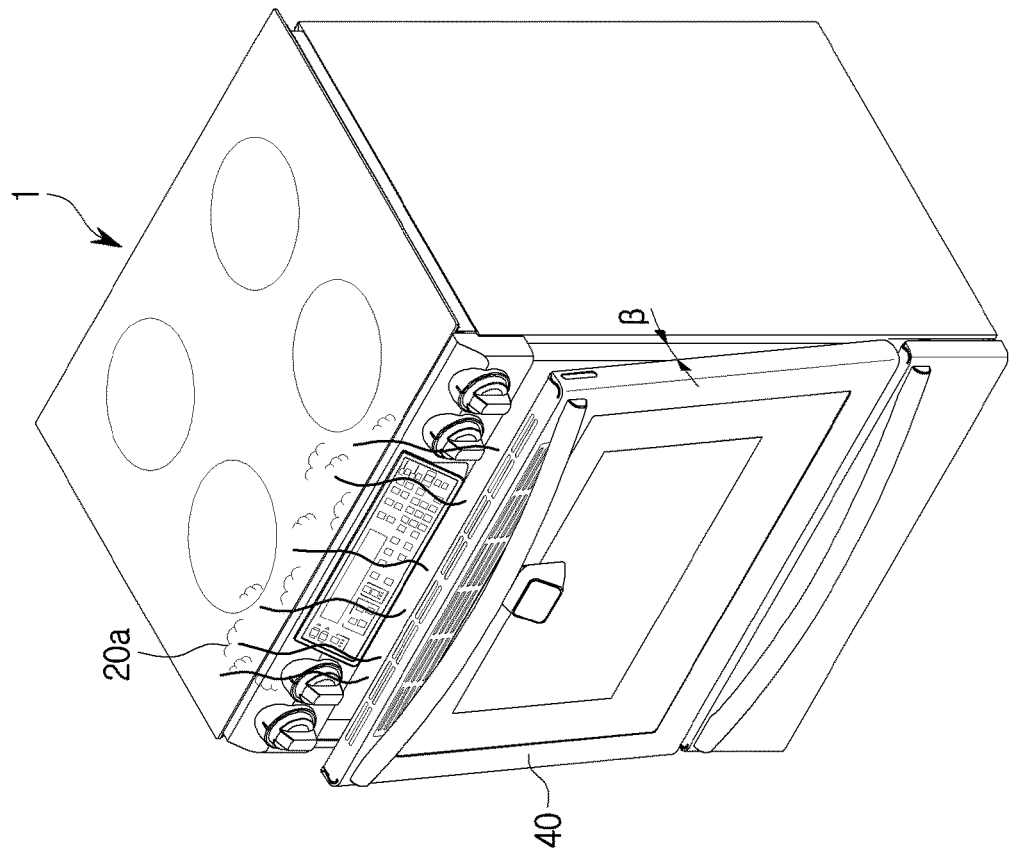

FIG. 20f
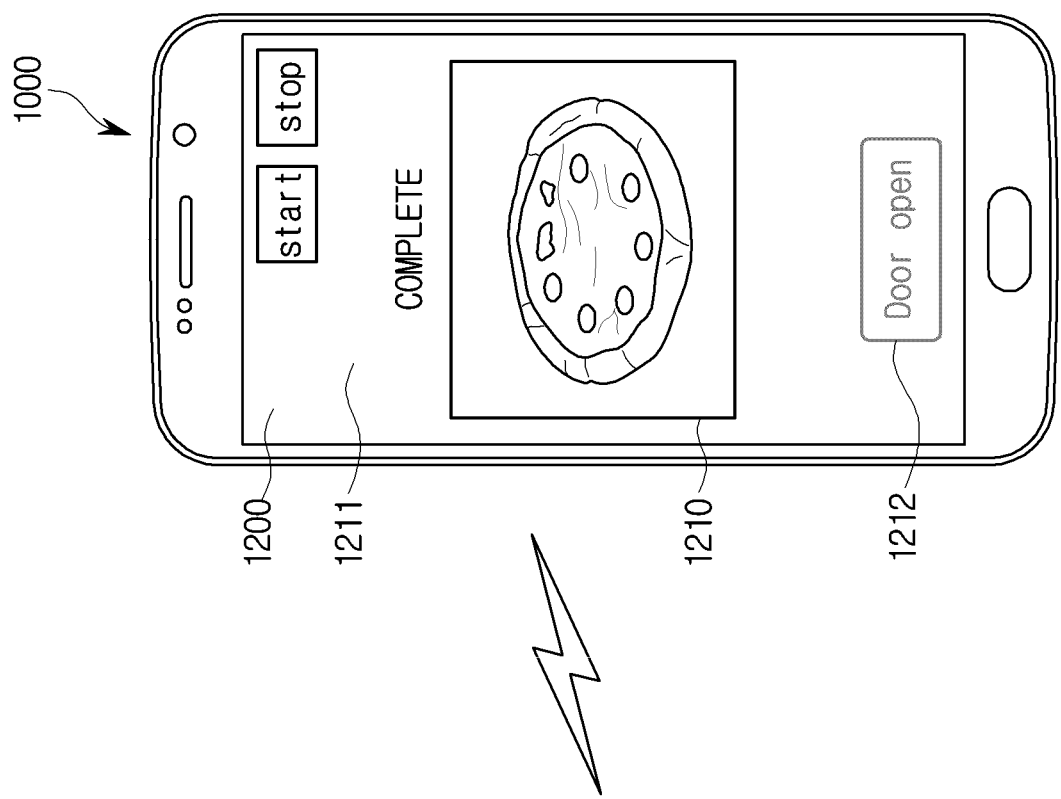
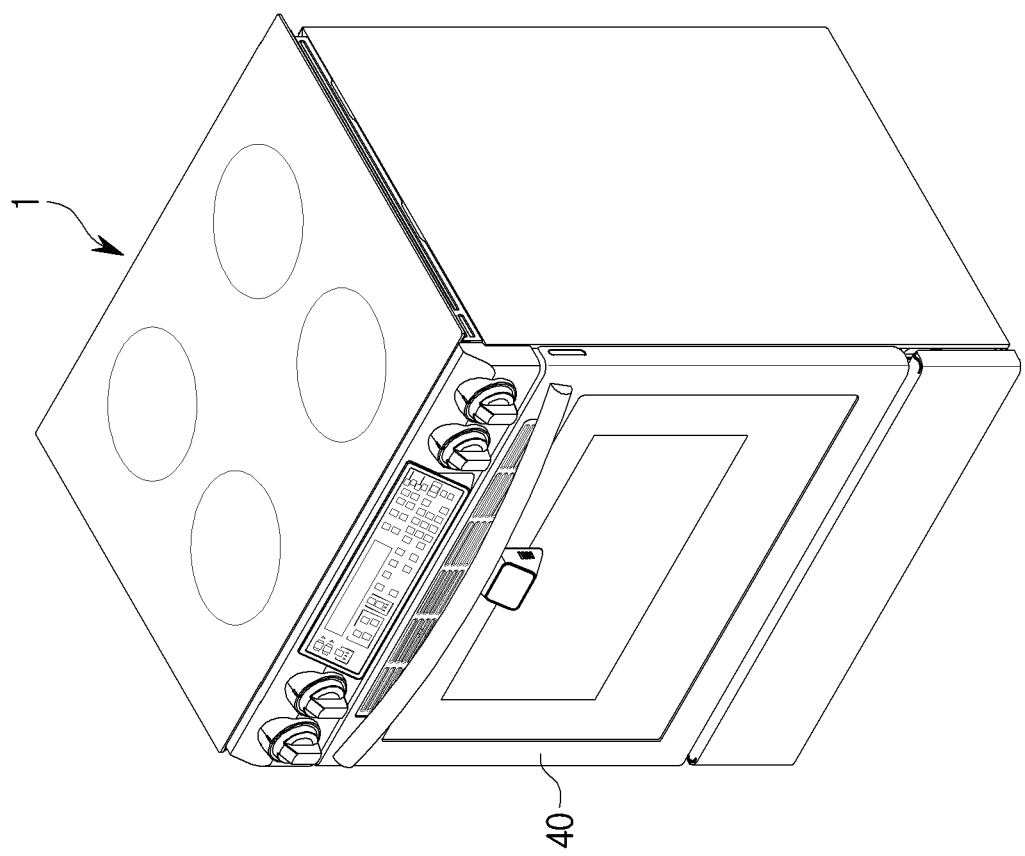

OVEN AND OVEN DOOR OPENING AND CLOSING METHOD

CROSS-REFERENCE TO RELATED APPLICATIONS

This application is a National Phase Application under 35 U.S.C. § 371 of PCT International Patent Application No. PCT/KR2016/012743, filed Nov. 7, 2016 which claims the foreign priority benefit under 35 U.S.C. § 119 to Korean Patent Application No. 10-2015-0159161 filed Nov. 12, 2015, the contents of which are incorporated herein by reference.

TECHNICAL FIELD

Following embodiments relate to an oven and a method of opening or closing a door of the oven. In detail, they relate to an oven capable of being remotely controlled to open or close a door thereof when cooking has been completed, and a method of opening or closing the door of the oven.

BACKGROUND ART

Ovens, which are appliances configured to cook foodstuff, may be classified as an electric oven, a gas oven, and a microwave oven according to a heat source thereof. An electric oven converts electric energy into thermal energy and heats foodstuff, a gas oven burns gases and heats foodstuff, and a microwave oven emits microwaves toward foodstuff to heat the foodstuff.

When cooking is performed using an oven, it is necessary to directly approach and check the oven to check a state of cooking of the foodstuff and add seasoning to the foodstuff. As necessary, the foodstuff may be checked through a transparent window of the oven or directly checked by opening a door.

When a user does something else outside a kitchen or cooks other foodstuff in the kitchen, it is inconvenient to multitask while checking the foodstuff in the oven.

DISCLOSURE OF THE INVENTION

Technical Solution

In accordance with an embodiment of the present disclosure, an oven includes: a cooking compartment provided in a case and configured to accommodate foodstuff; a door capable of opening or closing the cooking compartment; a camera portion capable of capturing an image of an inside of the cooking compartment and located outside the door; a communication portion connected to an external portable device; a door opening or closing unit configured to open or close the door by remote control; and a controller configured to control the camera portion, the communication portion, and the door opening or closing unit, the controller controls the communication portion to transmit one of a video or image captured using the camera portion to the portable device, and the controller controls the door opening or closing unit to open or close the door using the control information received through the communication portion.

In accordance with an aspect of the present disclosure, a door opening or closing unit may include a motor, a cam driven by the motor, a door latch connected to the cam and configured to linearly move, and a push bar connected to the door latch and configured to come into contact with the door.

In accordance with an aspect of the present disclosure, the controller may control the door opening or closing unit to open the door to an angle at which the door is closable by a weight of the door and an elastic force of a hinge.

In accordance with an aspect of the present disclosure, the camera portion may be disposed outside the door to incline and captures an image of the inside of the cooking compartment.

In accordance with an aspect of the present disclosure, the oven may further include a display portion which comprises a cooking-start button, and the controller may control the camera portion corresponding to reception of user input for selecting the cooking-start button.

In accordance with an aspect of the present disclosure, the oven may further include a light configured to provide additional light, and the controller may control the light to be operated corresponding to operation of the camera portion.

In accordance with another embodiment of the present disclosure, an oven includes: a cooking compartment provided in a case and configured to accommodate foodstuff; a door capable of opening or closing the cooking compartment; a camera portion disposed at an upper end outside the door to incline and configured to capture an image of an inside of the cooking compartment and located outside the door; a communication portion disposed adjacent to the camera portion, configured to transmit one of a video or image captured by the camera portion to the outside, and configured to receive a control information corresponding to opening or closing of the door; and a door opening or closing unit positioned at an upper end of the cooking compartment and configured to open or close the door through a push bar in contact with the door.

In accordance with an aspect of the present disclosure, the door opening or closing unit may include a motor to transfer a driving force, a cam to be rotated by the driving force transferred from the motor, a door latch connected to the cam and configured to reciprocally move, and a push bar connected to the door latch, configured to come into contact with the door, and configured to open or close the door.

In accordance with an embodiment of the present disclosure, a portable device includes: a display portion; a communication portion connected to an oven; and a controller configured to control the display portion and the communication portion. The controller operates an application to remote control the oven according to reception of first control information corresponding to starting of cooking foodstuff through the communication portion, and controls to display the application on the display portion. In accordance with reception of second control information corresponding to completion of the cooking foodstuff, the controller controls the communication portion to transmit third control information for opening the door of the oven.

Advantageous Effects

An oven having a door opening or closing unit capable of opening or closing a door driven by remote control and a method of opening or closing the door of the oven may be provided.

An oven having a door opening or closing unit configured to opening or closing a door of the oven according to a control signal received from a remote place and corresponding to opening or closing the door, and a method of opening or closing the door of the oven may be provided.

Not limited thereto, according to a variety of embodiments of the present invention, an oven having a door opening or closing unit capable of opening or closing a door according to remote control and a method of opening or closing the door of the oven may be provided.

BRIEF DESCRIPTION OF THE DRAWINGS

FIG. 18 is a schematic flowchart illustrating a method of opening or closing the door of the oven according to one embodiment of the present invention.

FIG. 19 is a schematic flowchart illustrating a method of opening or closing the door of the oven from the portable device according to one embodiment of the present invention.

FIGS. 20a to 20f are schematic diagrams illustrating an example of the method of automatically opening or closing the door of the oven according to one embodiment of the present invention.

MODE FOR CARRYING OUT THE INVENTION

Figure 1:
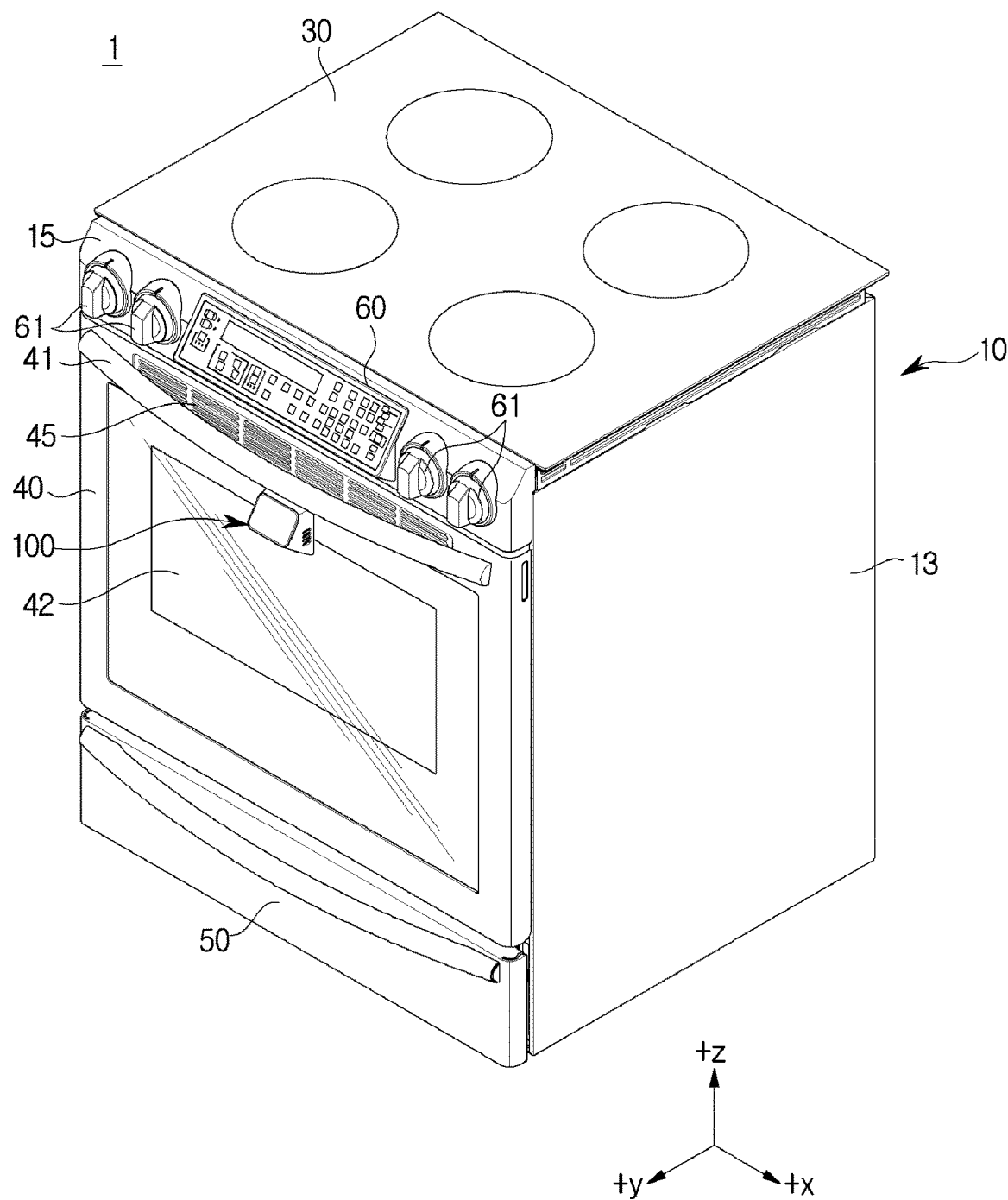
FIG. 1 is a schematic perspective view of an oven according to one embodiment of the present invention.

Hereinafter, exemplary embodiments of the present invention will be described in detail with reference to the contents illustrated in the attached drawings. Also, a method of manufacturing and using an oven and/or a portable device according to the embodiments of the present invention will be described in detail with reference to the contents illustrated in the attached drawings. The same reference numerals or symbols shown in the drawings refer to components or elements configured to perform substantially the same function.

The terms including ordinal numbers such as "first," "second," and the like may be used for describing a variety of components. However, the components are not limited by the terms. The terms are used only for distinguishing one component from another component. For example, without departing from the scope of the present invention, a first component may be referred to as a second component, and similarly, a second component may be referred to as a first component. The term "and/or" includes any and all combinations of one or a plurality of associated listed items.

In the embodiments of the present invention, "selection of a button (or key)" provided at an oven or a portable device 1000 (refer to FIG. 16) may be used as a term which refers to pressing a button (or key) or touching a button (or key). Also, "user input" may be used as a term including selection of a button (or key), pressing a button (or key), touching a button (or key), a touch gesture, a voice, or a motion of a user.

In the embodiments of the present invention, a controller may be used to mean "a microcomputer." Also, a communication portion may be used to mean "a communication board."

The terms used herein explain the embodiments but are not intended to restrict and/or limit the present invention. Singular expressions, unless clearly defined otherwise in context, include plural expressions. Throughout the specification, it should be understood that the terms "comprise," "have", and the like are used herein to specify the presence of stated features, numbers, steps, operations, elements, components or combinations thereof but do not preclude the presence or addition of one or more other features, numbers, steps, operations, elements, components, or combinations thereof.

The same reference numerals shown in the drawings refer to members which perform substantially the same function.

Hereinafter, the embodiments of the present invention will be described in detail with reference to the corresponding drawings.

A front used herein may refer to a direction in which a door 40 (or a surface of the door) of an oven 1 shown in FIG. 1 (for example, +y direction) faces. A front surface may refer to a surface corresponding to a door 40 which faces frontward. Also, a rear may refer to a direction opposite to the front of the oven 1 (for example, −y direction).

FIG. 1 is a schematic perspective view of an oven according to one embodiment of the present invention.

Figure 2:
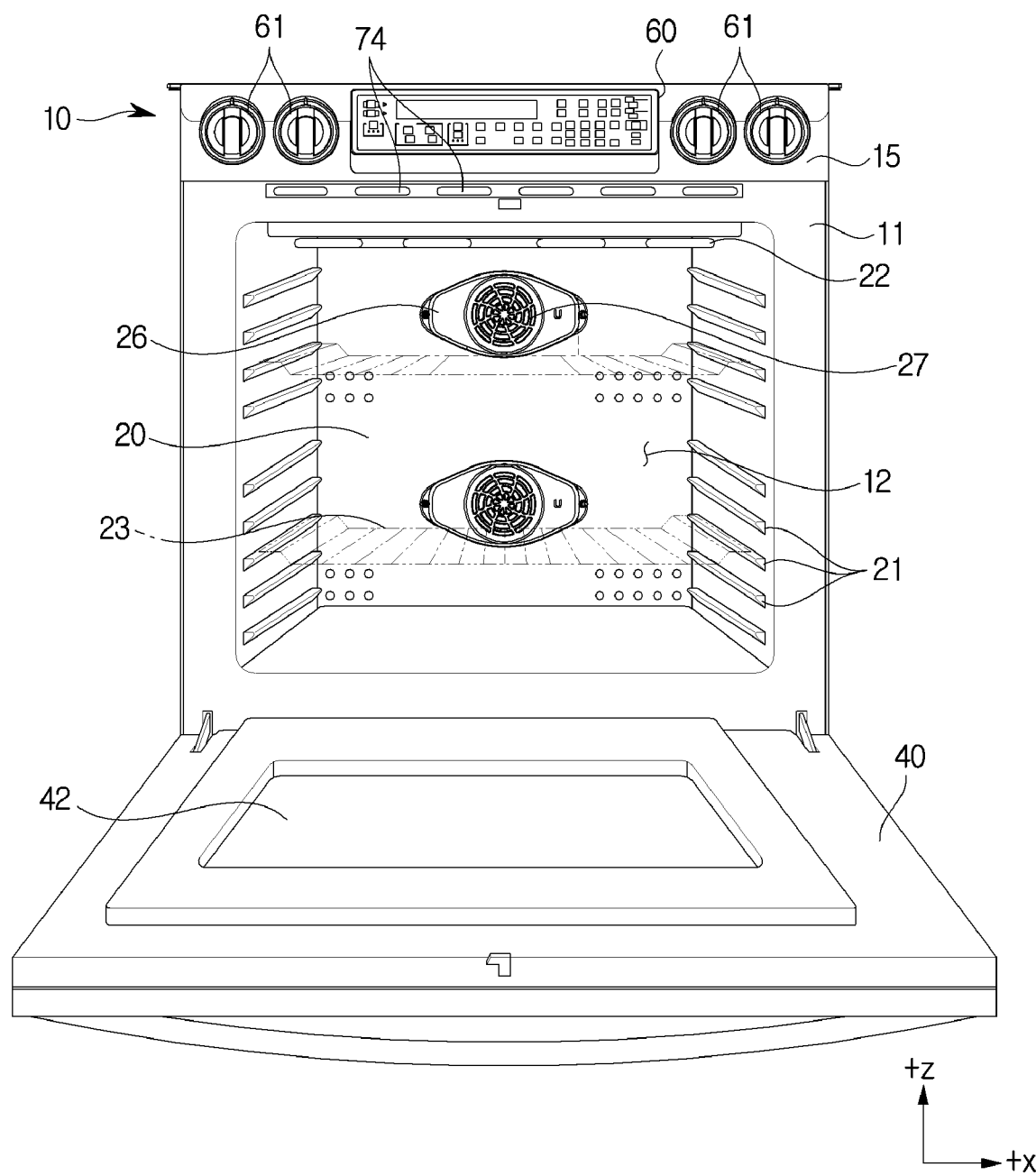
FIG. 2 is a schematic front view illustrating a state in which a door of the oven is open according to one embodiment of the present invention.

FIG. 2 is a schematic front view illustrating a state in which a door of the oven is open according to one embodiment of the present invention.

Figure 3:
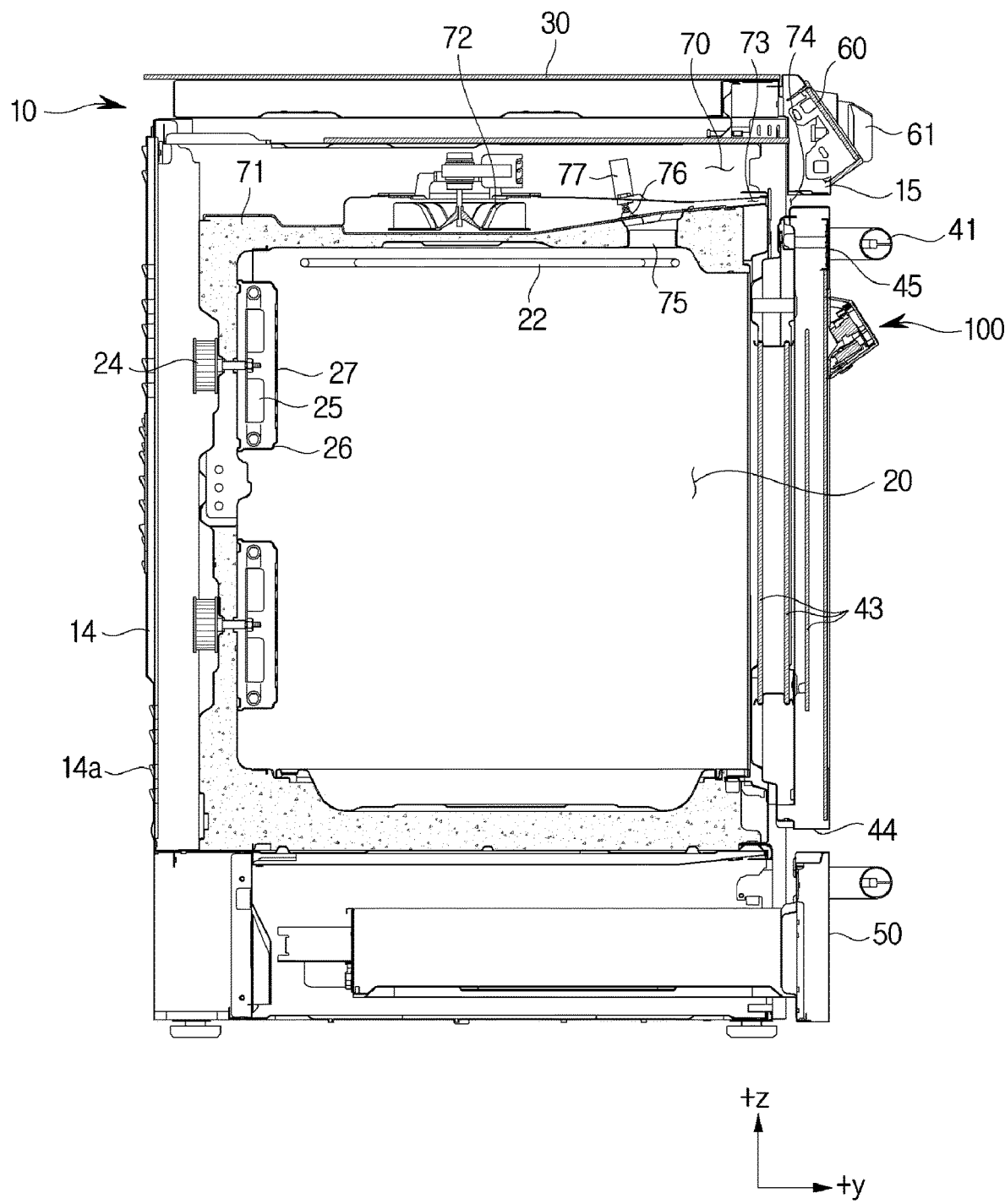
FIG. 3 is a schematic cross-sectional view of the oven according to one embodiment of the present invention.

FIG. 3 is a schematic cross-sectional view of the oven according to one embodiment of the present invention.

Referring to FIGS. 1 and 3, an oven range 1 (or a body including a case and a door, hereinafter referred to as an oven) may include a case 10, which forms an exterior, a cooking compartment 20 located inside the case 10, and a cook-top 30 provided on a top end of the oven 1 such that a container (not shown) which accommodates foodstuff may be put thereon and heated.

The case 10 may include a front panel 11 which forms a front surface, side panels 13 which are connected to the front panel 11 and form side surfaces, and a rear panel 14 which is connected to the side panels 13 and forms a rear surface.

The cooking compartment 20 may have a polyhedral shape provided inside the case 10 and may be configured to have one side (for example, corresponding to the door 40) to withdraw foodstuff from or insert foodstuff into the inside of the case 10. The front panel 11 may include an opening 12 corresponding to the cooking compartment 20 configured to have one open side.

One open side of the cooking compartment 20 may be opened or closed by the door 40. The door 40 may be coupled with a hinge to one side (for example, a bottom surface or a side surface) of the case 10 to be rotatable with respect to the case 10. A handle 41 to be gripped by a user may be located outside the door 40.

The door 40 may include a transparent area 42 formed of a transparent material such as glass and the like to externally check a process of cooking foodstuff in the cooking compartment 20.

One or more glass members 43 corresponding to the transparent area 42 may be provided inside the door 40. The glass member 43 may include another transparent material as well as glass.

A door suction hole 44 capable of suctioning air into the door 40 may be provided at an outer bottom end of the door 40. High-temperature air generated by the cooking compartment 20 may be cooled by circulation of air which is introduced through the door suction hole 44. The air which is introduced through the door suction hole 44 may be discharged outward through a door discharge hole 45 located at a top of the door 40. Inside the door 40, a heat exchange may occur between the air which is introduced through the door suction hole 44 and the high-temperature air in the cooking compartment 20.

On side surfaces which face each other of the inside of the cooking compartment 20, a plurality of supports 21 may be provided. Racks 23 on which foodstuff is put may be mounted using the supports 21 which protrude from the side surfaces facing each other.

A divider (not shown) capable of dividing the cooking compartment 20 into a plurality of spaces (for example, top/bottom or left/right) may be mounted on the plurality of supports 21. The divider may be mounted corresponding to a gap between the supports 21 vertically located on the basis of a bottom of the cooking compartment 20.

In a division compartment (not shown) divided into a plurality of spaces by a divider (not shown) formed of an insulating material, a size of each of the divided spaces may be equal or different. Also, separate cooking compartments (not shown) divided by a divider formed of an insulating material may be insulated thermally. A user may divide the cooking compartment 20 in various ways using the divider according to his or her intention.

A heater 22 which heats foodstuff may be provided in the cooking compartment 20. The heater 22 may be exposed to the inside of the cooking compartment 20. In the embodiment of the present invention, the heater 22 may be an electric heater including an electric resistor. In another embodiment of the present invention, the heater 22 may be a gas heater. In the embodiment of the present invention, the oven 1 may include an electric oven or a gas oven.

A storage compartment 50 may be provided below the cooking compartment 20. The storage compartment 50 may be inserted into or withdrawn from the oven 1 as a drawer by sliding.

A circulation fan 25 which evenly heats foodstuff by circulating air in the cooking compartment 20 and a circulation motor 24 which drives the circulation fan 25 may be provided in the rear of the cooking compartment 20. A fan cover 26 which protects the circulation fan 25 may be provided in front of the circulation fan 25. A through hole 27 is formed at the fan cover 26 to allow air to flow.

A display portion 60 capable of displaying operation information and information on the state of the oven 1 and receiving a user command for operating the oven 1 may be located above the front panel 11. An operation portion 61 which includes a knob for operating the oven 1 may be provided on at least one of a left side and a right side of the display portion 60. A door opening or closing button (not shown) for opening or closing the door 40 may be located on at least one of the display portion 60 and the operation portion 61.

At least one of the display portion 60 and the operation portion 61 may be mounted on a machine room cover 15. The display portion 60 mounted on the machine room cover 15 may be provided to tilt at a preset angle (for example, greater than 0° and smaller than 90°) on the basis of a bottom surface of the cooking compartment 20.

The oven 1 has a machine room 70 which accommodates an electric device component which controls operations of a variety of components including the display portion 60. The machine room 70 may be provided above the cooking compartment 20 as a separate space from the cooking compartment 20. An insulating material 71 may be disposed between the machine room 70 and the cooking compartment 20.

High-temperature heat (or air) from the cooking compartment 20 may not be transferred to the machine room 70 due to the insulating material 71. The insulating material 71 may be configured to cover the outside of the cooking compartment 20 so as to not transfer the high-temperature heat of the heated cooking compartment 20 to the outside of the oven 1 as well as to be disposed between the machine room 70 and the cooking compartment 20. One surface of the insulating material 71 may be opened corresponding to the one open side of the cooking compartment 20 (for example, the door 40 is opened or closed).

The machine room 70 may be cooled by air circulated around the cooking compartment 20. A cooling fan unit 72 may blow air for cooling the machine room 70 using a cooling fan (not shown) driven by a cooling motor (not shown), and air suctioned by the cooling fan unit 72 may be discharged frontward from the oven 1 through a cooling flow path 73.

Air outside the oven 1 may be suctioned into the machine room 70 through a through hole 14a formed at the rear panel 14, cool the machine room 70, and be finally discharged frontward from the oven 1 through a discharge hole 74 along the cooling flow path 73.

Some air of the cooking compartment 20 may be suctioned into the cooling flow path 73 and be discharged frontward from the oven 1 through an air discharge flow path 75. A bypass hole 76 which suctions part of the air, which flows from the cooling flow path 73 to the discharge hole 74, into the air discharge flow path 75 may be separately formed. The bypass hole 76 may be opened or closed by an opening or closing device 77. An amount of the air from the cooking compartment 20, which is discharged through the cooling flow path 73, may be adjusted depending on opening or closing the bypass hole 76.

Hereinafter, a monitoring unit 100 which captures an image of the inside of the cooking compartment 20 will be described in detail.

Figure 4:
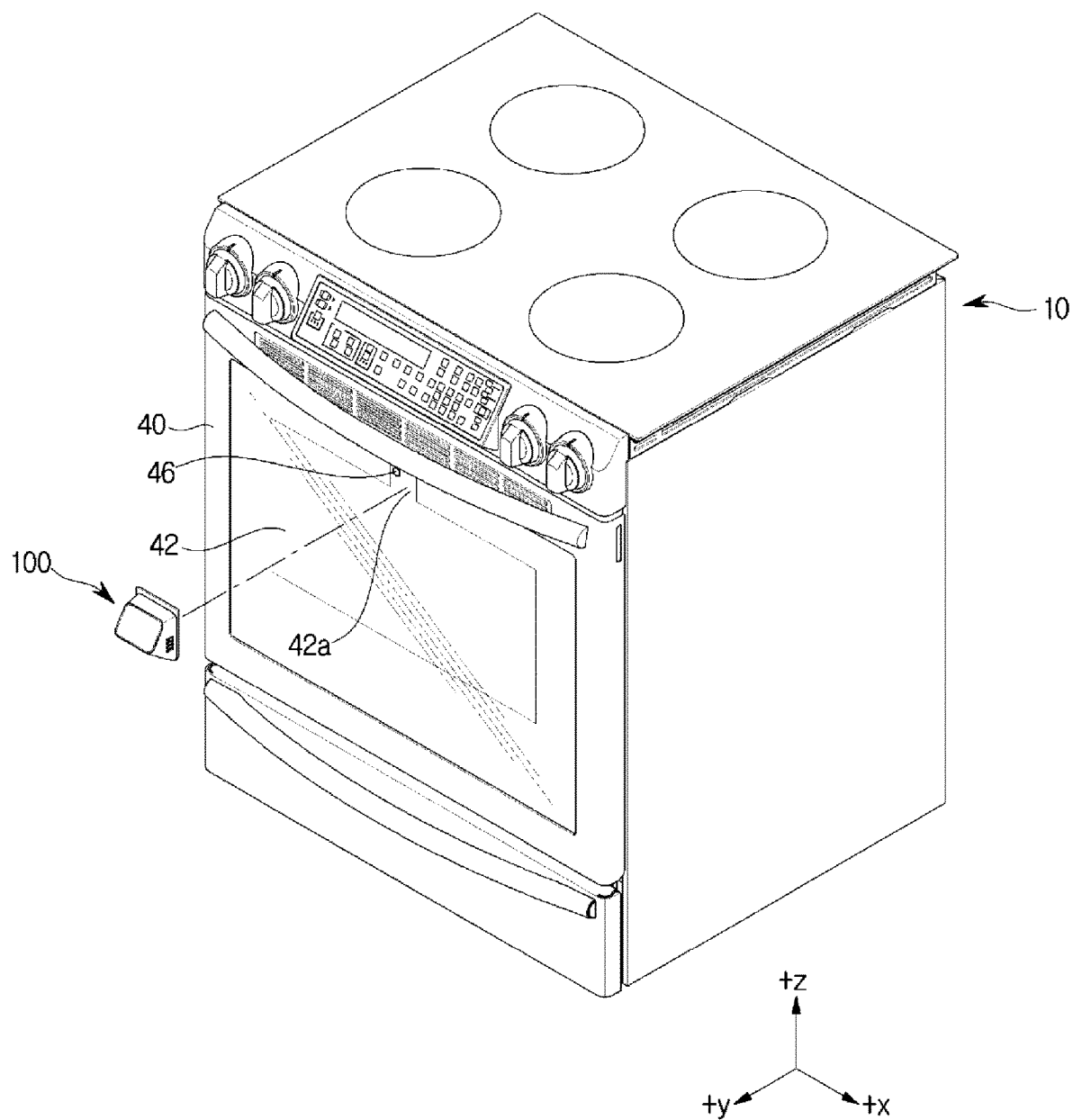
FIG. 4 is a schematic perspective view illustrating the monitoring unit separated from the oven according to one embodiment of the present invention.

FIG. 4 is a schematic perspective view illustrating the monitoring unit separated from the oven according to one embodiment of the present invention.

Figure 5:
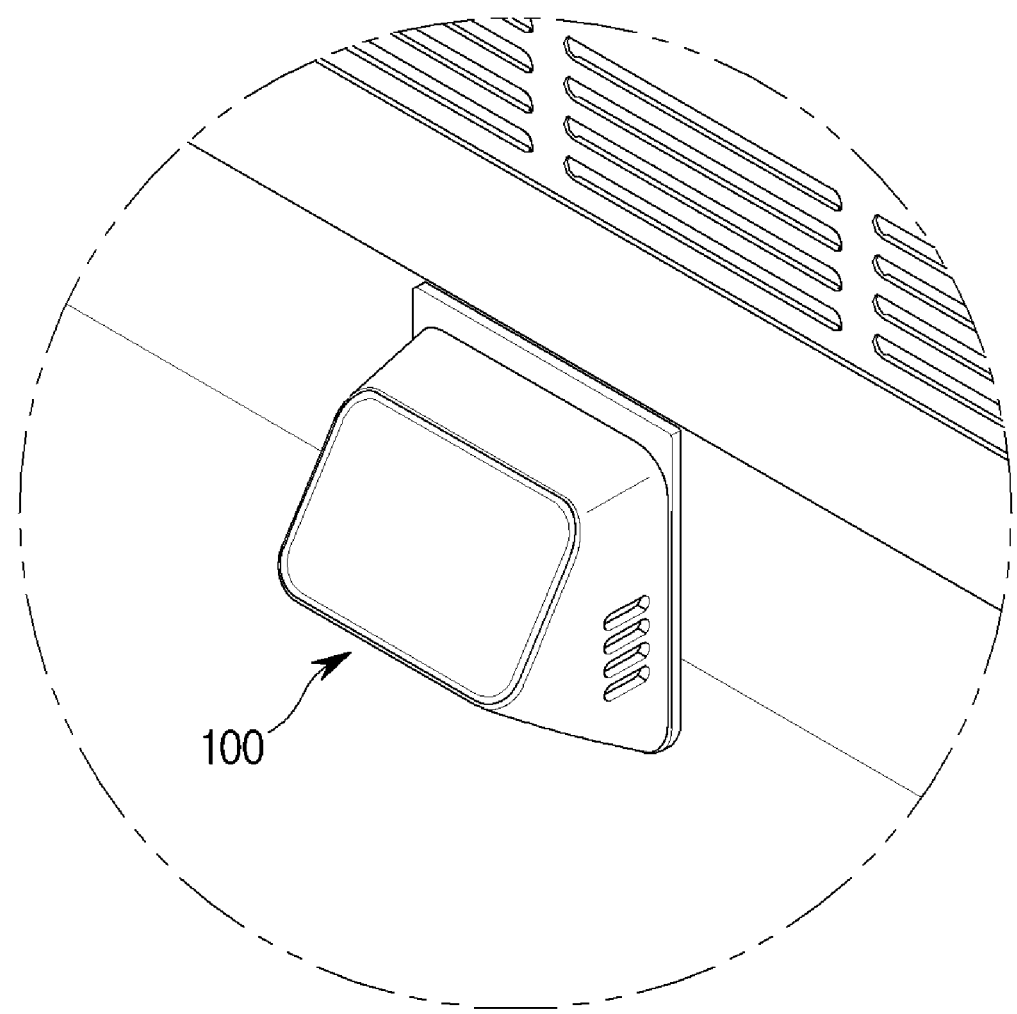
FIG. 5 is a schematic enlarged perspective view illustrating the monitoring unit of the oven according to one embodiment of the present invention.

FIG. 5 is a schematic enlarged perspective view illustrating the monitoring unit of the oven according to one embodiment of the present invention.

Figure 6:
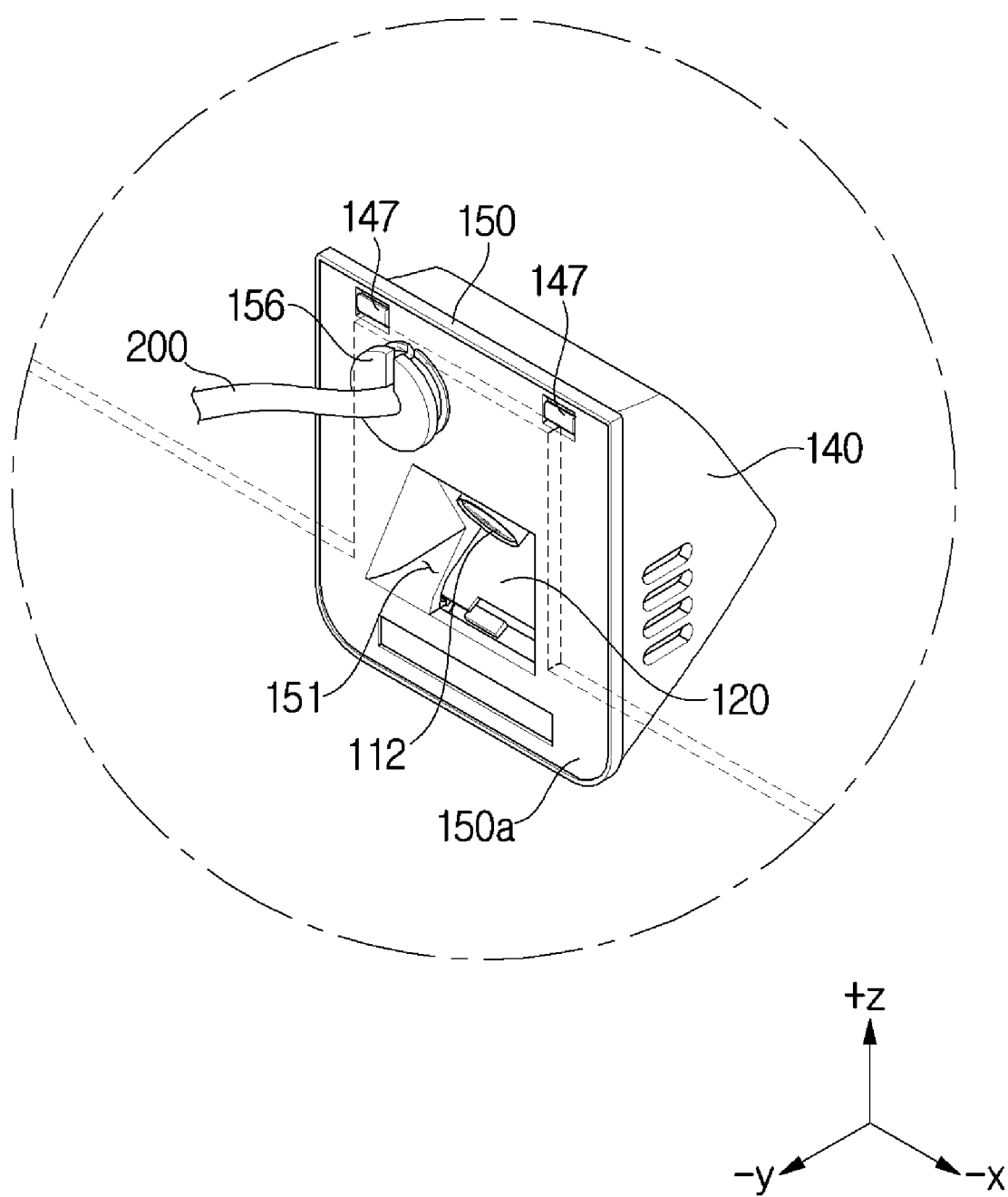
FIG. 6 is a schematic enlarged perspective view illustrating a rear surface of the monitoring unit of the oven according to the embodiment of the present invention.

FIG. 6 is a schematic enlarged perspective view illustrating a rear surface of the monitoring unit of the oven according to the embodiment of the present invention.

Figure 7:
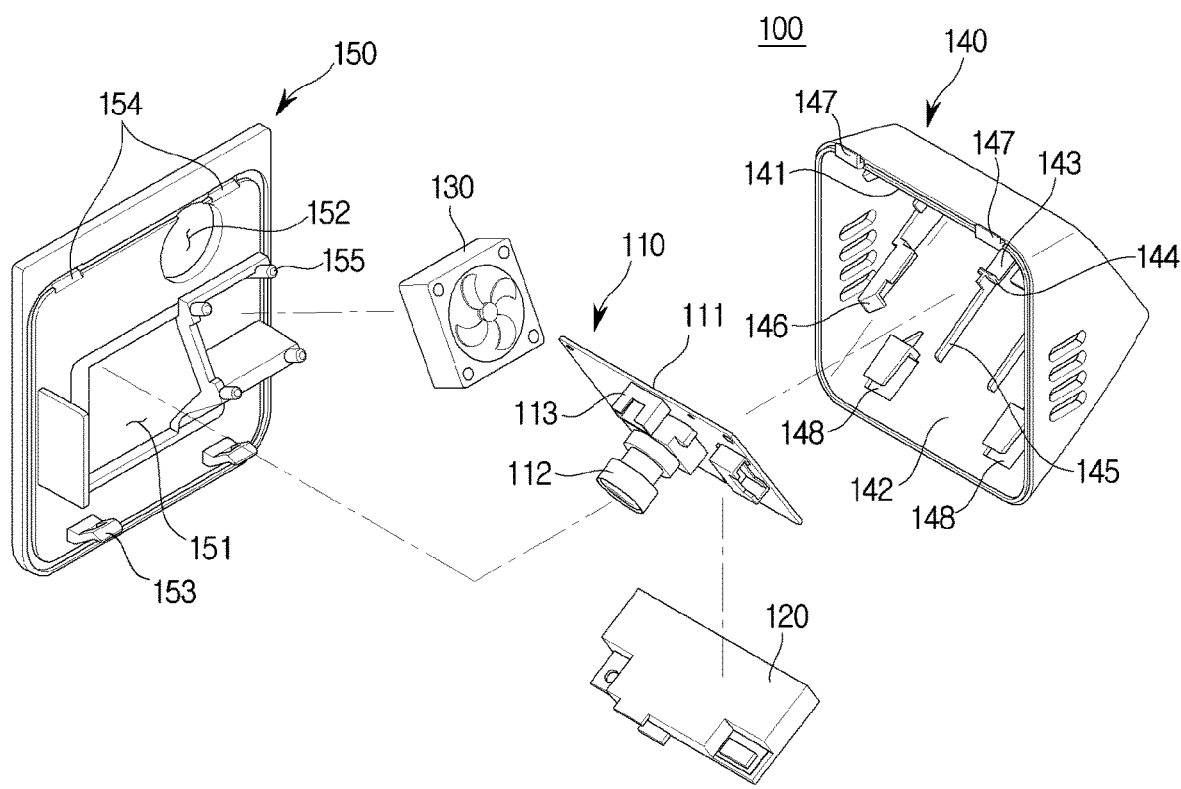
FIG. 7 is a schematic exploded perspective view illustrating the monitoring unit of the oven according to the embodiment of the present invention.

FIG. 7 is a schematic exploded perspective view illustrating the monitoring unit of the oven according to the embodiment of the present invention.

Figure 8:
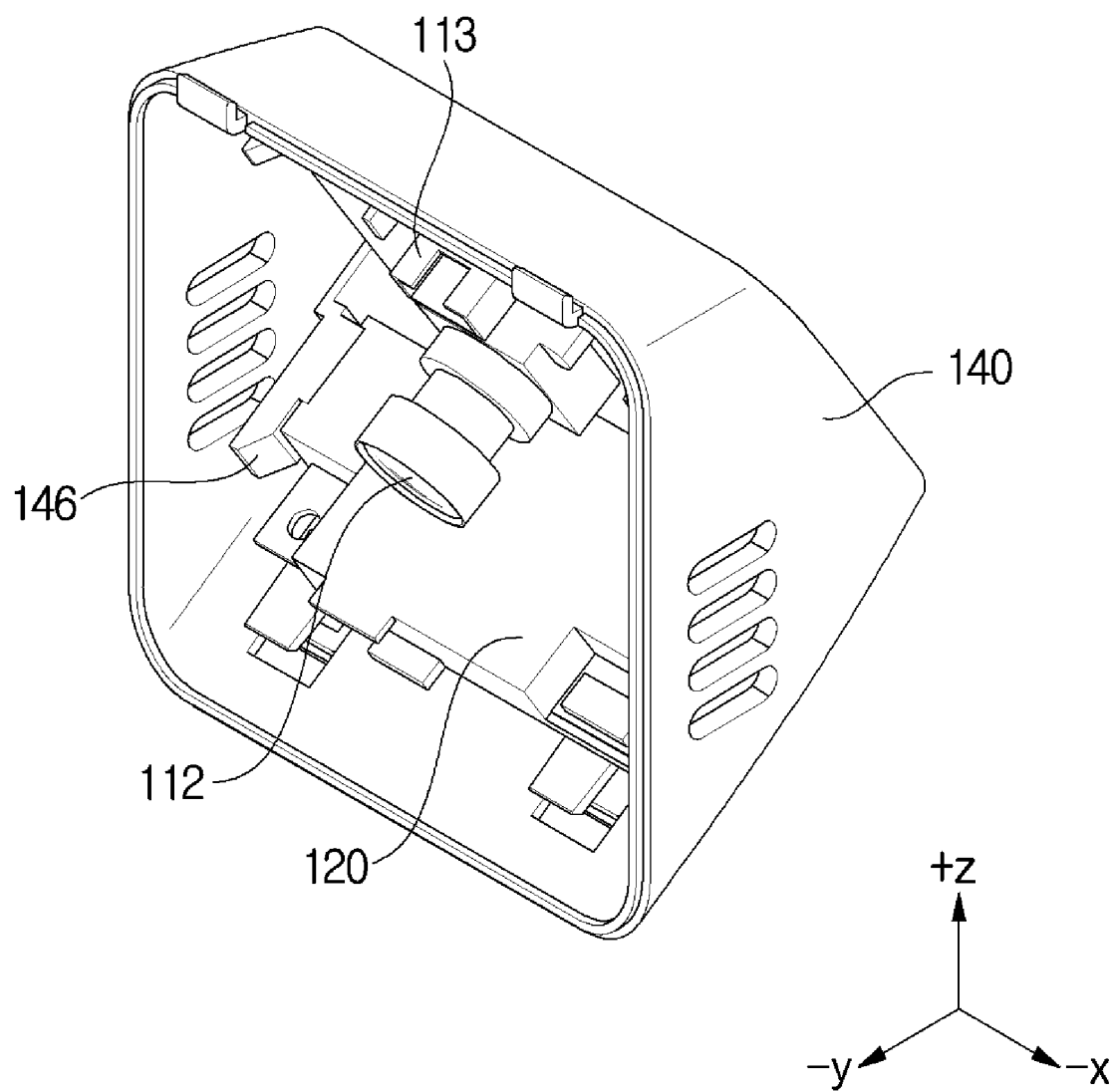
FIG. 8 is a schematic rear perspective view illustrating the monitoring unit while a first housing of the oven is removed according to the embodiment of the present invention.

FIG. 8 is a schematic rear perspective view illustrating the monitoring unit while a first housing of the oven is removed according to the embodiment of the present invention.

Figure 9:
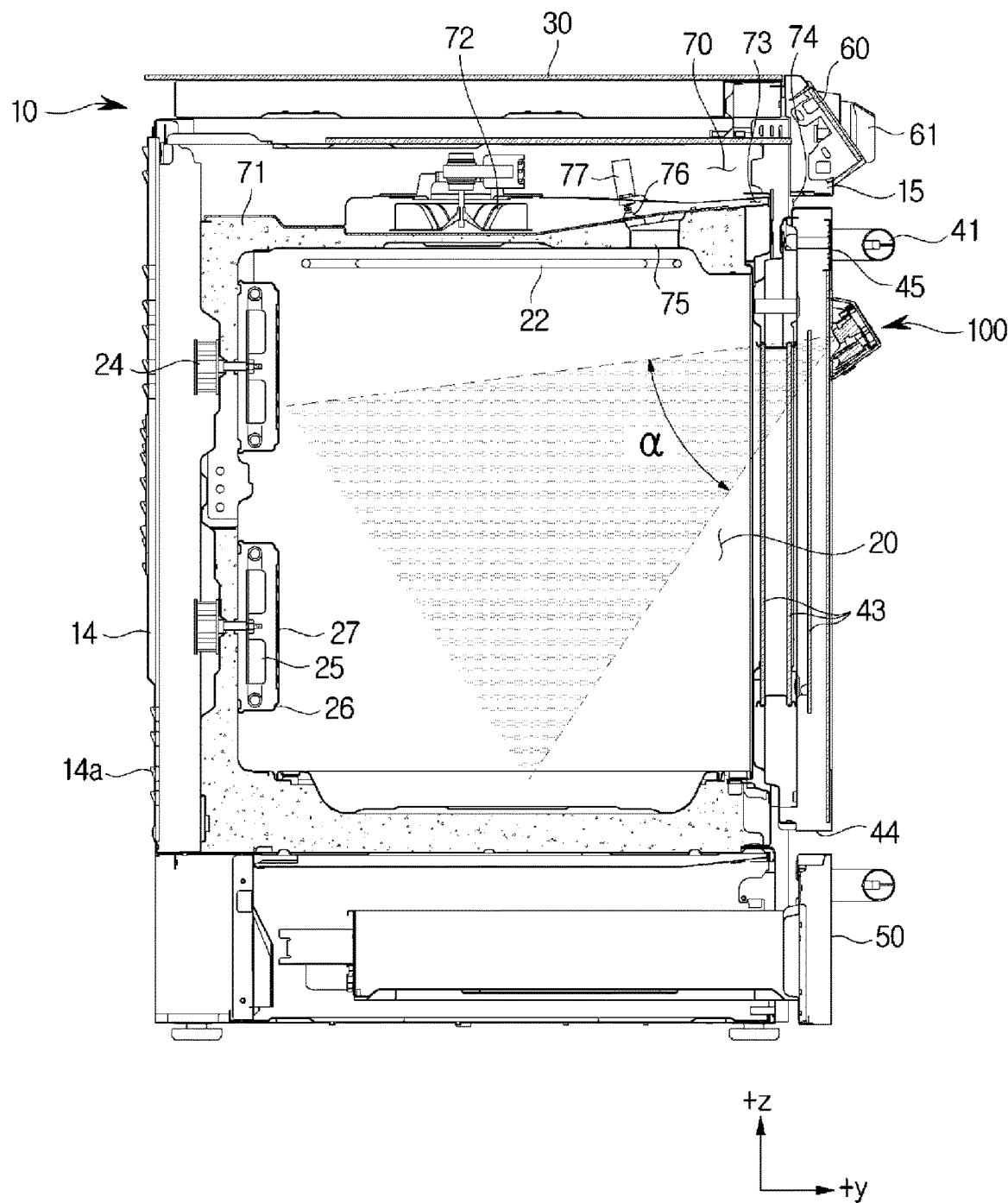
FIG. 9 is a schematic diagram illustrating a view angle of the monitoring unit of the oven according to the embodiment of the present invention.

FIG. 9 is a schematic diagram illustrating a view angle of the monitoring unit of the oven according to the embodiment of the present invention.

Referring to FIGS. 4 and 9, the monitoring unit 100 may be disposed outside the door 40. The monitoring unit 100 may be located outside the transparent area 42 of the door 40 and may capture an image of foodstuff located in the cooking compartment 20 through the transparent area 42.

The monitoring unit 100 may be located in a central area of the door 40 (for example, a vertical area having a width of 35 mm on left/right sides on the basis of a central point of the door 40. A part of the monitoring unit 100 (for example, a part of a second housing) may be located in the central area of the door 40. Another part of the monitoring unit 100 may be located outside the central area of the door 40. Also, the monitoring unit 100 may be located at a top end of the central area of the door 40 (for example, a part adjacent to the display portion 60).

The monitoring unit 100 which is located outside the transparent area 42 and capable of capturing an image of the inside of the cooking compartment 20 may have low heat resistance in comparison to a case of being located inside the cooking compartment 20 to capture an image of the cooking compartment 20. For example, a temperature of the cooking compartment 20 in which foodstuff is currently cooking may be maintained between 80° C. and 285° C. Also, when a self-cleaning process is performed, a temperature of the cooking compartment 20 may maximally increase to 450° C.

It should be easily understood by one of ordinary skill in the art that the temperature of the cooking compartment 20 is merely an example and may change corresponding to performance and/or a structure of the oven 1.

The monitoring unit 100 disposed outside the door 40 may have lower heat resistance and advantages of maintenance in comparison to a monitoring unit (not shown) disposed inside the cooking compartment 20.

In another embodiment of the present invention, the monitoring unit 100 may be disposed on one side of the case 10 instead of the outside of the door 40. The oven 1 may include an additional transparent area (not shown) for capturing an image of the inside of the cooking compartment 20 to correspond to a position of the case 10 in which the monitoring unit 100 is located.

A corresponding area 42a may be provided on one side of the transparent area 42 at a position of the monitoring unit 100 which is in contact with the transparent area 42. The corresponding area 42a may be provided at a position capable of maximally capturing an image of the inside of the cooking compartment 20 (for example, foodstuff, the rack, the supports, and the like).

The monitoring unit 100 may be disposed at a position (for example, a position of the corresponding area) corresponding to a maximum image-capturing angle (for example, a view angle) of a camera portion 110.

Referring to FIGS. 6 to 8, the monitoring unit 100 may include the camera portion 110 which captures an image of the inside of the cooking compartment 20 and a communication portion (or a communication board) 120 which transmits information captured by the camera portion 110 (for example, a video, image, or the like) to the outside and receives external information (for example, control information which controls an operation of the oven). Also, the monitoring unit 100 may include a cooling fan 130 which cools the camera portion 110 and a housing 140 and 150 which form an exterior of the monitoring unit 100.

The camera portion 110 may include a camera 112 capable of capturing image and video of the inside of the cooking compartment 20, a connector 113 which is connected to the cable 200, receives power from the oven 1, and transmits/receives electrical information, and a camera board 111 on which the camera 112, the connector 113, and other electronic components are mounted.

The camera 112 capable of capturing an image of the inside of the cooking compartment 20 through the transparent area 42 of the door 40 may have a vertical image-capturing angle $\alpha$ of about 60° (for example, between 45° and 75°) and a leftward and rightward image-capturing angle of about 100° (for example, an angle between 75° and 120°).

A disposition angle of the camera portion 110 at the monitoring unit 100 may be determined corresponding to the maximum image-capturing angle of the camera 112. The camera portion 110 may be disposed to have an incline with respect to an inner surface of the door 40 to allow the entire inside of the cooking compartment 20 to be included in the maximum image-capturing angle.

The camera portion 110 may be disposed to be tilted at a preset angle (for example, between 20° and 70°) with respect to the door 40. It will be easily understood by one of ordinary skill in the art that an angle between the camera portion 110 and the door 40 may change corresponding to a size and shape of the inside of the cooking compartment 20.

A light 115 (refer to FIG. 11) may provide an auxiliary light source necessary for the camera portion 110 to capture an image of the inside of the cooking compartment 20. The light 115 may be located at a top end of the cooking compartment 20 and a plurality of such lights 115 may be present.

The light 115 may operate corresponding to a start of cooking in the oven 1.

The brightness of the light 115 may be to a degree which allows a user to check a state of cooking with naked eyes through an image of foodstuff or a video of foodstuff located inside the cooking compartment 20, which is captured by the camera portion 110. Also, the brightness of the light 115 may be to a degree which allows a user to check a state of cooked foodstuff located in an inward side of the cooking compartment 20 (for example, adjacent to the circulation fan 25 located at a position opposite the door 40), which is captured by the camera portion 110, with naked eyes.

The brightness of the light 115 may be 300 lux (lx) to 800 lx in consideration of an internal temperature of the cooking compartment 20 and an image-capturing environment of the camera portion 110. The brightness of the light 115 may be 500 lx to 900 lx. Also, the brightness of the light 115 may be 600 lx to 990 lx.

It will be easily understood by one of ordinary skill in the art that the brightness of the light 115 and/or the number of the lights 115 may change corresponding to a size and structure of the cooking compartment 20.

The communication portion 120 may transmit image information or video information of the inside of the cooking compartment 20, which is generated by the camera portion 110, to the outside (for example, a portable device) and may receive information from the outside (for example, control information and the like for controlling an operation of the oven).

The communication portion 120 may transmit and receive a wireless signal through mobile communication methods such as 3-generation (3G), 4-generation (4G), and the like and may transmit and receive a wireless signal through a variety of local area communication methods such as wireless local area network (LAN), wireless fidelity (Wi-Fi), Bluetooth, Zigbee, Wi-Fi direction (WFD), ultra-wideband (UWB), infrared data association (IrDA), Bluetooth low energy (BLE), near field communication (NFC), and the like.

The communication portion 120 may be located inside the monitoring unit 100 or the case 10 of the oven 1. The communication portion 120 may be located in a low-temperature area in the oven 1. Also, the communication portion 120 may be located inside a controller (or a microcomputer) 300.

Information transmission/reception of the communication portion 120 will be described in detail.

In the monitoring unit 100, the cooling fan 130 capable of cooling the camera portion 110 may be located on one side of the camera portion 110. An internal temperature of the monitoring unit 100 may be higher than room temperature due to heat transferred from the cooking compartment 20.

The cooling fan 130 may cool the camera portion 110 at a temperature (approximately 65° C. or between 45° C. and 75° C.) higher than room temperature due to heat generated by the camera portion 110 and heat transferred from the outside of the monitoring unit 100 to an adequate temperature for stable driving of the camera portion 110. The cooling fan 130 may also cool heat generated by the communication portion 120.

The housing 140 and 150 which forms an exterior of the monitoring unit 100 may include a first housing 140 on which at least one of the camera portion 110 and the communication portion 120 is mountable, and a second housing 150 in contact with the outside of the door 40.

The first housing 140 may include a space which has an opening at one side to allow at least one of the camera portion 110 and the communication portion 120 to be mounted therein. A first mounting portion 141 on which the camera portion 110 is mounted and a second mounting portion 142 on which the communication portion 120 is mounted may be included inside the first housing 140.

The first mounting portion 141 on which the camera portion 110 is mounted may be configured to have an incline corresponding to an incline of the camera portion 110 (for example, between 20° and 70°).

One side adjacent to the first mounting portion 141 and the second mounting portion 142 may protrude from the second mounting portion 142 toward the first mounting portion 141. The one side adjacent to the first mounting portion 141 and the second mounting portion 142 may include a first support protrusion 143 which supports the camera portion 110 to be parallel to the first mounting portion 141 and comes into contact with a bottom side of the camera portion 110 and a first fixing hook 144 which fixes the camera portion 110 mounted on the first support protrusion 143.

Components (not shown) similar to the first support protrusion 143 and the first fixing hook 144 may be provided at a top side of the first mounting portion 141 to support the top side of the camera portion 110.

The second mounting portion 142 may include a second support protrusion 145 which protrudes upward from the second mounting portion 142 to support a bottom side of the communication portion 120. Also, a second fixing hook 146 which protrudes inward from both side portions of the first housing 140 may be provided to fix the communication portion 120 supported by a second support protrusion.

It will be easily understood by one of ordinary skill in the art that the above-described support protrusions 143 and 145 and fixing hook 144 and 146 are an example and may have various shapes and structures to mount the camera portion 110 and the communication portion 120 to the first housing 140.

The communication portion 120 may be arranged to be adjacent to the second mounting portion 142.

When some components of the monitoring unit 100 are arranged inside the door 40 or inside the case 10, the communication portion of the monitoring unit 100 may be disposed outside the door 40 or outside the case 10.

A first coupling hook 147 may be provided at a top side of the opening of the first housing 140 to be coupled with the second housing 150. The first coupling hook 147 may be provided corresponding to a first coupling groove 154 of the second housing 150 and may be inserted into and coupled to the first coupling groove 154.

A second coupling groove 148 may be provided at a bottom side of the opening of the first housing 140 to be coupled with the second housing 150. The second coupling groove 148 is provided corresponding to a second coupling hook 153 provided at the second housing 150.

The above-described coupling hooks 147 and 153 and coupling grooves 154 and 148 are an example and mutual positions thereof may be reversely formed. The second housing 150, as described above, may be configured to be separable from the first housing 140 and couplable to the door 40.

The second housing 150 includes an installation surface 150*a* at a side which faces the door 40. The installation surface 150*a* may be provided to be parallel to the door 40 and may be adhered to the outside of the door 40 by an adhesive (or an adhesive tape) and the like. The second housing 150 may be coupled to the outside of the door 40 using an additional coupling member (for example, a screw, hook, or the like).

The second housing 150 may include an open portion 151 opened to allow the camera portion 110 mounted in the first housing 140 to pass through the second housing 150 and capture an image of the inside of the cooking compartment 20.

A size of the open portion 151 may be determined corresponding to an installation angle of the camera portion 110 and the image-capturing angle of the camera 112.

A cable through hole 152 which allows the cable 200 which electrically connects the monitoring unit 100 and the controller 300, which will be described below, to the inside of the monitoring unit 100 may be provided at one side of the second housing 150.

The cable through hole 152 may be provided at a position corresponding to a door through hole 46 configured to allow the cable 200 to pass through from the inside to the outside of the door 40. The cable 200 which is connected to the controller 300 and extends may pass the inside of the door 40, may pass through the door through hole 46 and the cable through hole 152, and may be connected to the inside of the monitoring unit 100.

A sealing member 156 may be provided inside the cable through hole 152. The sealing member 156 may prevent a gap which may be formed between the cable through hole 152 and the cable 200 and may prevent heat from being transferred from the inside of the door 40 to the monitoring unit 100.

A cooling fan support protrusion 155 which supports the cooling fan 130 may be provided on a side of the second housing 150, which faces the first housing 140.

The cooling fan support protrusion 155 may protrude from the second housing 150 toward the first housing 140 at a preset angle to dispose the cooling fan 130 at the same incline as that of the camera portion 110.

In an order of coupling the monitoring unit 100 to the door 40, the second housing 150 of the monitoring unit 100 is located in the corresponding area 42a of the transparent area 42 and the installation surface 150a is attached to the door 40 to come into contact therewith. Also, the first housing 140, which includes the camera portion 110 and the communication portion 120, may be pressurized toward and coupled to the second housing 150 which faces the first housing 140.

An order of separating the monitoring unit 100 from the door 40 may be reversed from the order of coupling the monitoring unit 100 to the door 40. When the monitoring unit 100 is separated from the door 40 (or when the first housing 140 is separated from the door 40), components of the monitoring unit 100 may be replaced.

The housing 140 and 150 may be formed of a material including plastic, resin, or the like.

The camera 112 may be configured to be pivotable by a pivoting member (not shown). Hereinafter, other components excluding additionally described components may be equal to the above-described components of the first housing of the oven 1.

The pivoting member (not shown) may be provided between a camera 112 and a camera board 111 such that the camera 112 may pivot due to pivoting of the pivoting member. The pivoting member has a hinge structure and may pivot the camera 112 upward/downward or leftward/rightward. Also, a pivoting member having a ball structure (not shown) may freely pivot the camera 112 (for example, clockwise or counterclockwise).

When the camera 112 pivots due to the pivoting member, an image-capturing range of the camera 112 may increase. Clear video information or image information of foodstuff cooked in the cooking compartment 20 may be captured by the camera 112 which is pivoting.

Hereinafter, the cable 200 which electrically connects the controller 300 to the monitoring unit 100 will be described in detail.

Figure 10:
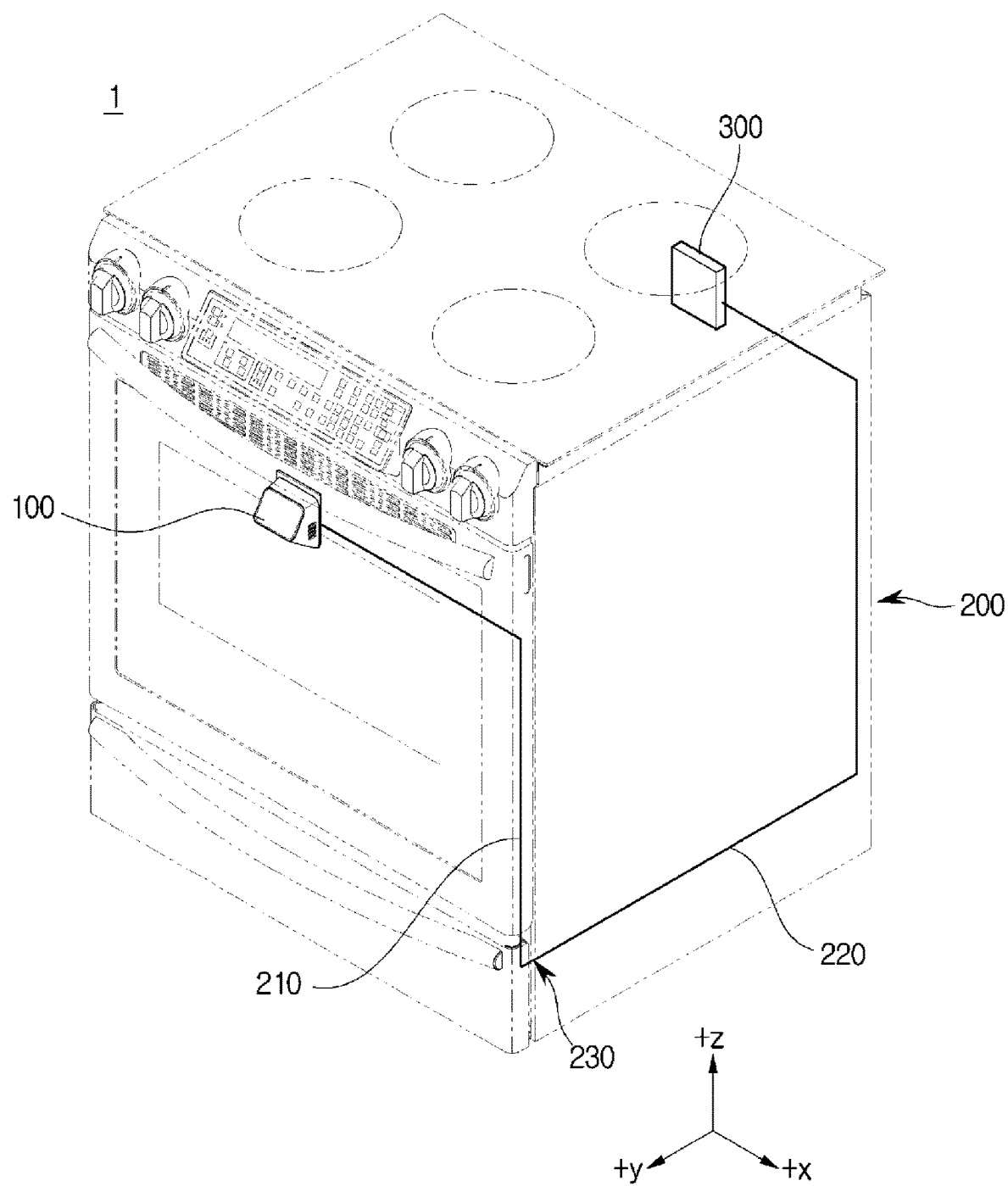
FIG. 10 is a schematic diagram illustrating an arrangement of the cable installed in the oven according to one embodiment of the present invention.

FIG. 10 is a schematic diagram illustrating an arrangement of the cable installed in the oven according to one embodiment of the present invention.

The oven 1 may include the controller 300 which controls the monitoring unit 100. The controller 300 may control only the monitoring unit 100 or may control the oven 1 and the monitoring unit 100. Hereinafter, the controller 300 which controls the monitoring unit 100 and the oven 1 will be described.

The controller 300 is defined to have a configuration including a processor, a substrate on which the processor is mounted, and one or a plurality of electronic components which drive (or control) the components of the oven 1. The controller 300 may include a power supply portion (not shown).

The controller 300 will be described below in detail.

The controller 300 and the monitoring unit 100 may be connected through the cable 200. The controller 300 and the monitoring unit 100 may be electrically connected through the cable 200. Also, the controller 300 and the monitoring unit 100 may be connected through short range wireless communications. The cable 200 may be a USB cable, and a cable capable of transmitting/receiving information between the controller 300 and the monitoring unit 100 may be enough.

The cable 200 may supply power from the controller 300 or the power supply portion to the monitoring unit 100. Also, the cable 200 may perform as an interface which transmits/receives information between the controller 300 and the monitoring unit 100.

The controller 300 may be located inside the rear panel 14 of the oven 1. Also, the controller 300 may be located on the side panel 13 of the oven 1. The cable 200 configured to connect the controller 300 to the monitoring unit 100 may pass through an inside of the side panel 13.

The cable 200 connected to the controller 300 may be bent from the inside of the rear panel 14 toward the inside of the side panel 13, bent again toward the front of the oven 1 in the vicinity of the storage compartment 50, and disposed at the front panel 11.

The cable 200 may pass between the insulating material 71 located inside the side panel 13 and the side panel 13.

The cable 200 which passes through the inside of the side panel 13 may pass through the front panel 11 and be connected to the monitoring unit 100 inside the door 40. When the door 40 is separated from the oven 1, the cable 200 may be easily separated.

A cable section connected to the monitoring unit 100 and disposed inside the door 40 is referred to as a first cable 210. A cable section, which extends from the first cable 210 and is connected to the controller 300 and disposed inside the case 10, is referred to as a second cable 220. A separation section 230 separated from the first cable 210 and the second cable 220 may be provided between the first cable 210 and the second cable 220.

Figure 11:
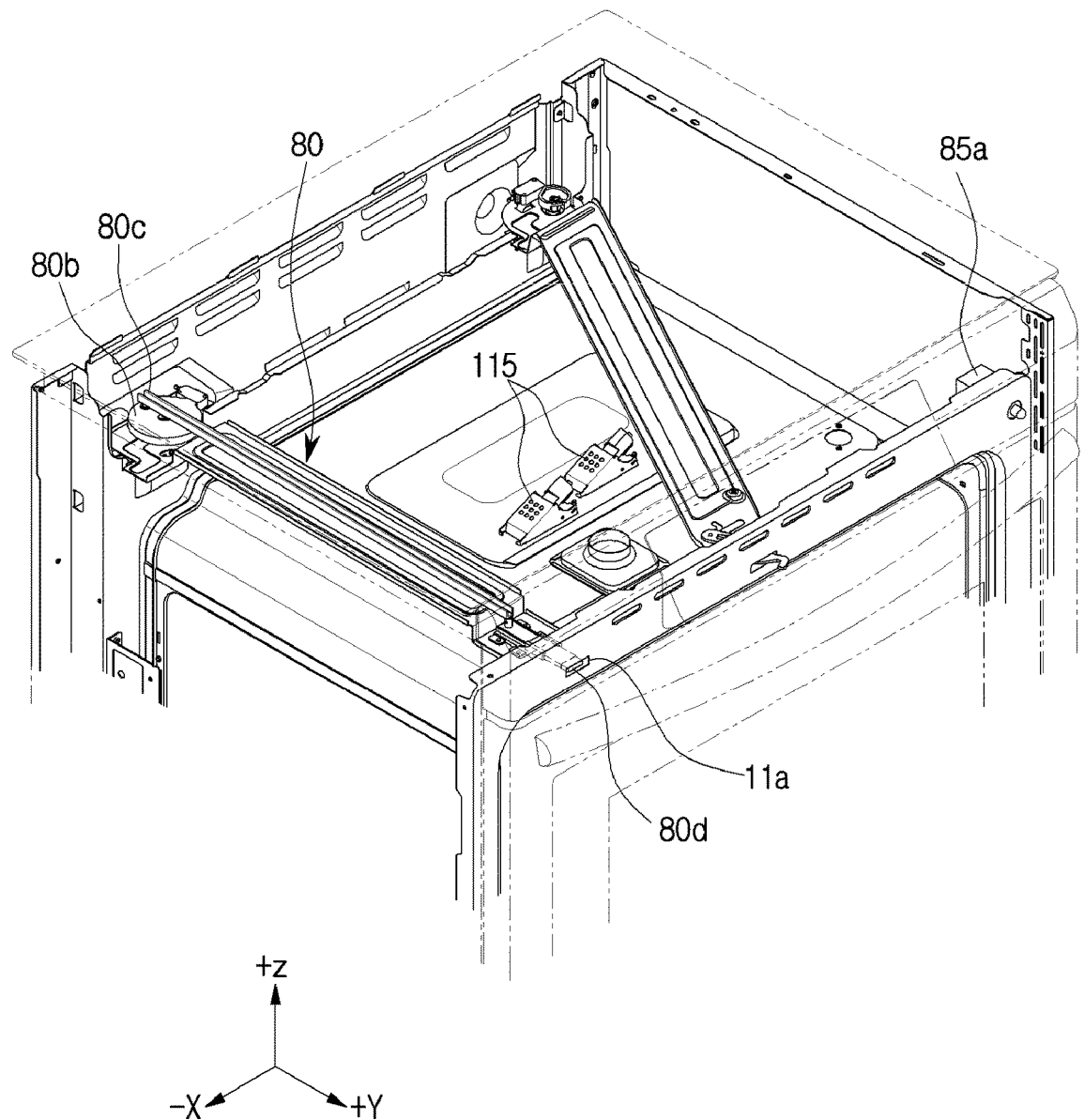
FIG. 11 is a schematic diagram illustrating a door opening or closing unit of the oven according to the embodiment of the present invention.

FIG. 11 is a schematic diagram illustrating a door opening or closing unit of the oven according to the embodiment of the present invention.

Figure 12:
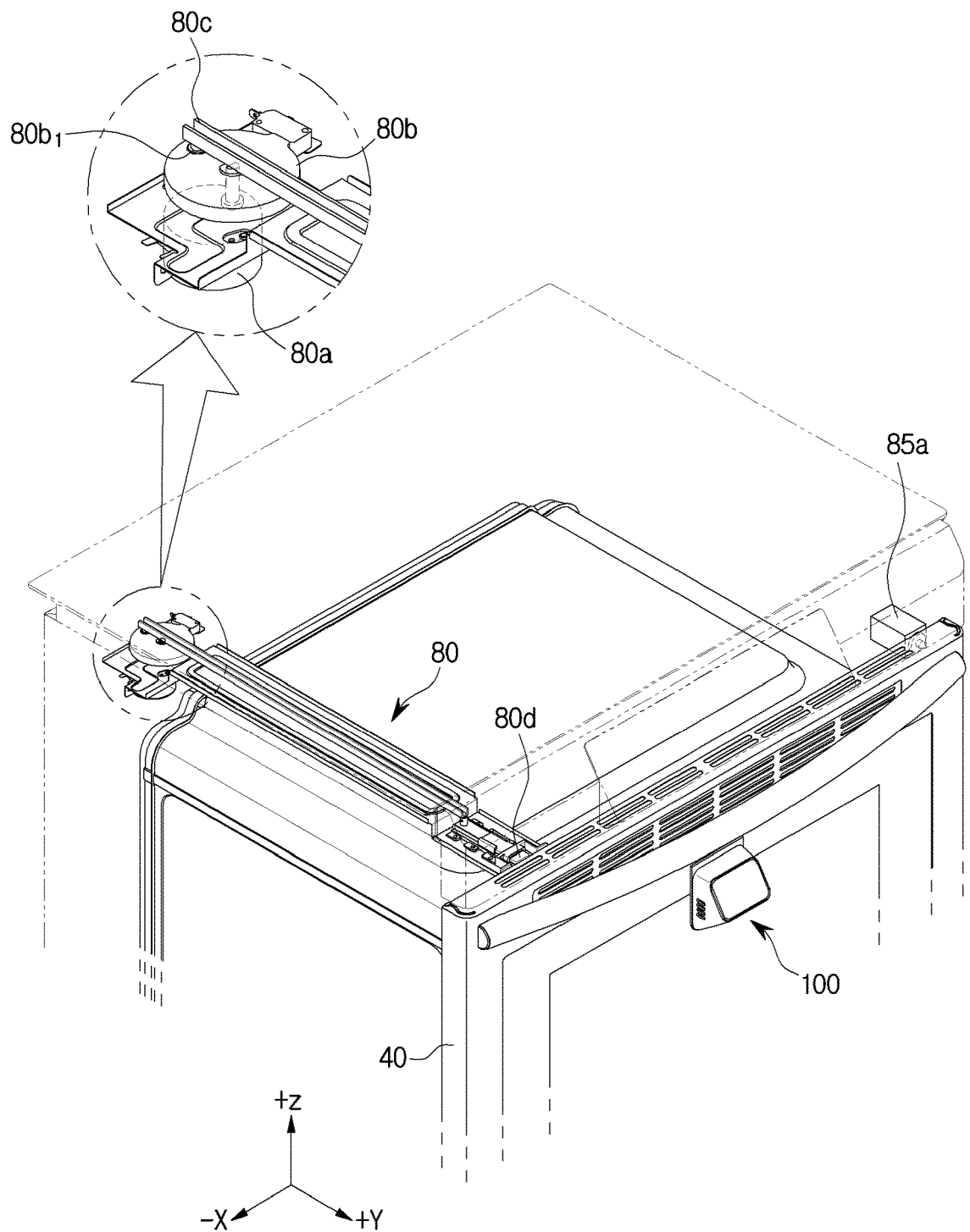
FIG. 12 is a schematic diagram illustrating the door opening or closing unit when the door in the oven is closed according to the embodiment of the present invention.

FIG. 12 is a schematic diagram illustrating the door opening or closing unit when the door in the oven is closed according to the embodiment of the present invention.

Figure 13:
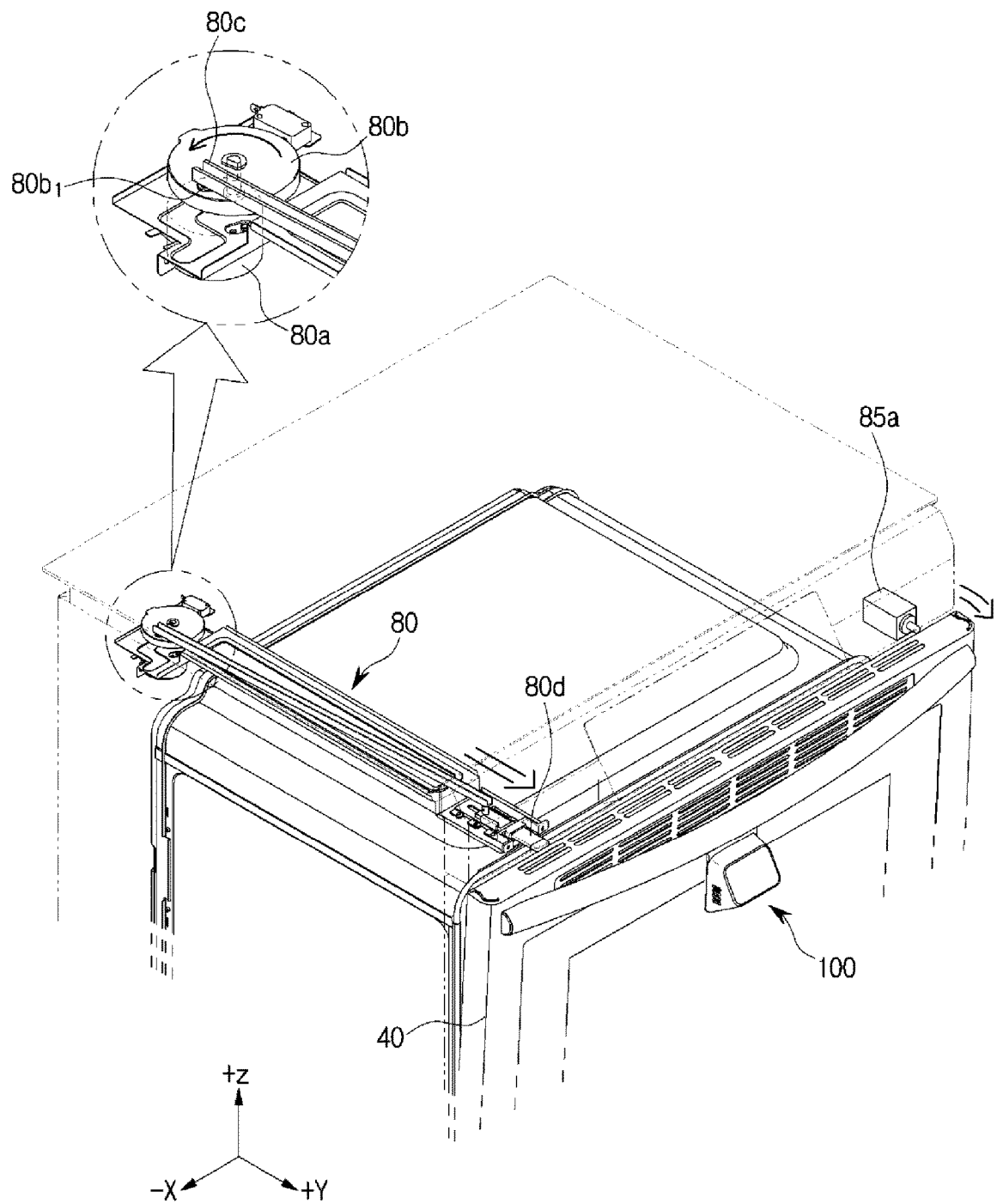
FIG. 13 is a schematic diagram illustrating the door opening or closing unit when the closed door in the oven is opened according to the embodiment of the present invention.

FIG. 13 is a schematic diagram illustrating the door opening or closing unit when the closed door in the oven is opened according to the embodiment of the present invention.

Figure 14:
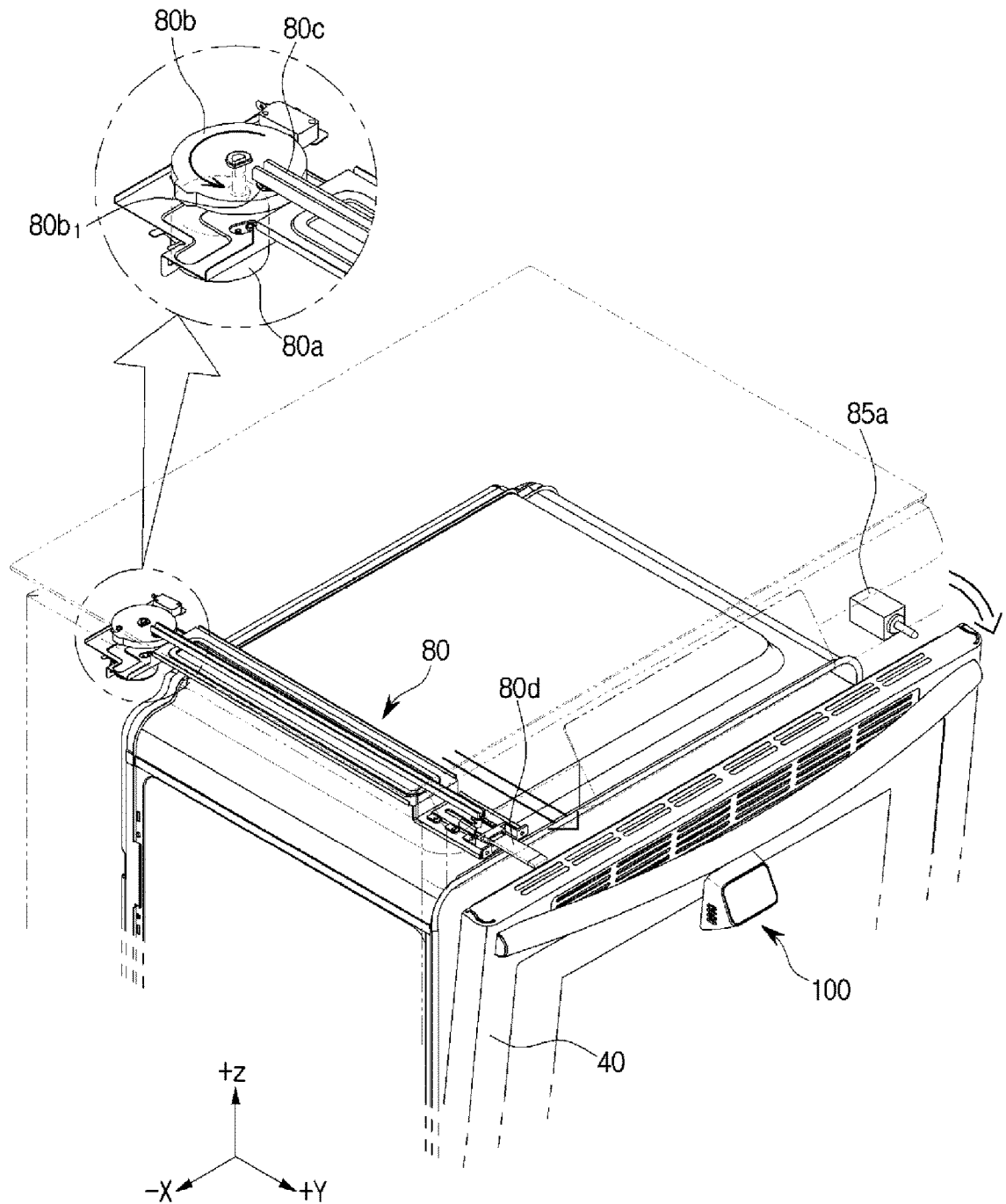
FIG. 14 is a schematic diagram illustrating the door opening or closing unit when the door in the oven is opened according to the embodiment of the present invention.

FIG. 14 is a schematic diagram illustrating the door opening or closing unit when the door in the oven is opened according to the embodiment of the present invention.

Figure 15:
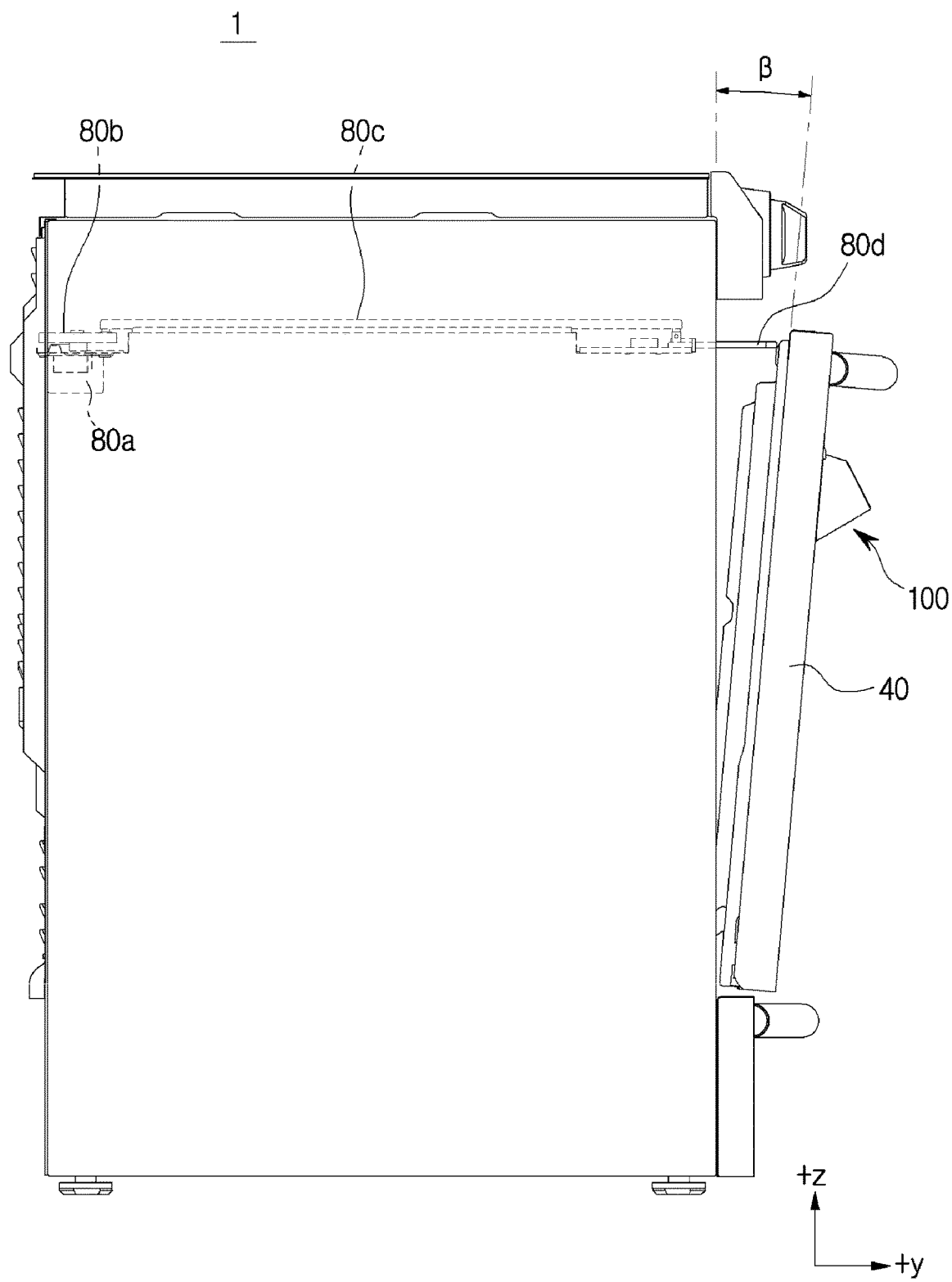
FIG. 15 is a schematic diagram illustrating an angle between the door and the front panel when the door in the oven is opened according to the embodiment of the present invention.

FIG. 15 is a schematic diagram illustrating an angle between the door and the front panel when the door in the oven is opened according to the embodiment of the present invention.

Referring to FIGS. 11 to 15, when foodstuff is cooked in the cooking compartment 20, the door 40 of the oven 1 is closed. The controller 300 may restrict opening of the door 40 during cooking.

The door opening or closing unit 80 configured to automatically open the door 40 when cooking of foodstuff is completed may include a motor 80a, a cam 80b connected to the motor 80a, a door latch 80c connected to the cam 80b, and a push bar 80d. Also, the door latch 80c and the push bar 80d may be integrated as a whole.

The door opening or closing unit 80 may be located to be adjacent to the side panel 13 on the basis of the central area of the door 40. The door opening or closing unit 80 may be located not to overlap with the monitoring unit 100 in a vertical direction (for example, a +/−z-axis direction).

The controller 300 may control driving of the motor 80a corresponding to a cooked state of foodstuff (for example, being cooked, completely cooked, or the like). When cooking is completed, the controller 300 may operate the motor 80a located below the cook-top 30 and between the cook-top 30 and the cooking compartment 20.

Corresponding to rotation of the motor 80a, the cam 80b connected to a shaft of the motor 80a may rotate in one direction (for example, one of a counterclockwise direction or a clockwise direction). The cam 80b may be circular or elliptical. The cam 80b may convert a rotation of the motor 80a into linear reciprocation of the door latch 80c.

The push bar 80d connected to the door latch 80c which linearly reciprocates may protrude outward from the front panel 11 through a through hole 11a of the front panel 11 or may be inserted into the front panel 11.

The push bar 80d may come into contact with the door 40. The door 40 may be opened or closed by a movement of the push bar 80d in contact with the door 40.

When the oven 1 is operating, the door 40 may be closed to come into contact with the front panel 11 of the oven 1. When the oven 1 is operating, the door 40 may be closed to come into contact with the front panel 11 of the oven 1 by a weight of the door 40. Also, when the oven 1 is operating, the door 40 may be closed to come into contact with the front panel 11 of the oven 1 by the weight of the door 40 and an elastic force of a hinge.

The door 40 may not be easily opened due to a weight latch (not shown). The door 40 may not be easily opened due to the weight thereof, the elastic force of the hinge, and the weight latch. A user may open the closed door 40 by applying an external force (for example, 6.5 kgf or more) to the handle 41. It will be easily understood by one of ordinary skill in the art that the above-described external force is an embodiment and may vary according to a size, weight, or shape of the door 40.

It will be easily understood by one of ordinary skill in the art that the external force applied to the door 40 may vary corresponding to the size of the door 40.

A driving force of the motor 80a may be amply sufficient to open the door 40.

When the driving force of the motor 80a is removed from the door 40, the door 40 may be closed by the weight and the elastic force of the hinge. Also, when the driving force of the motor 80a is removed from the door 40, the door 40 may be closed by the weight thereof.

When the door 40 is closed (for example, on the basis of cam rotation when rotation of the cam is 0°), a connection part 80b1 between the cam 80b and the door latch 80c is spaced farthest apart from the door 40.

When the connection part 80b1 is spaced farthest apart from the door 40, the push bar 80d may not be exposed outward from the through hole 11a of the front panel 11. Also, when the connection part 80b1 is spaced farthest apart from the door 40, a part of the push bar 80d (for example, a exposure length of the push bar 80d, for example, 10% or less of 52 mm) may be exposed outward at the through hole 11a of the front panel 11.

When cooking is completed, the cooking compartment 20 may include foodstuff and high-temperature air. When cooking is completed and then high-temperature air is not discharged, completely cooked foodstuff may be overcooked by the high-temperature air.

When cooking is completed, the motor 80a may start rotation under control of the controller 300. The connection part 80b1, between the cam 80b and the door latch 80c, which rotate with the start of rotation of the motor 80a, may gradually approach the door 40.

The door 40 may be gradually opened by the door latch 80c and the push bar 80d starting from when the cam 80b rotates counterclockwise by 1° or more. Also, the door 40 may be gradually opened by the door latch 80c and the push bar 80d starting from when the cam 80b rotates counterclockwise by 89° or less.

When the cam 80b rotates counterclockwise by 90° or more, the door 40 may be a little opened by the door latch 80c and the push bar 80d. The high-temperature air may be discharged through an open space between the door 40 and the front panel 11. The high-temperature air may be discharged outward from the cooking compartment 20 starting from when the space between the door 40 and the front panel 11 is opened.

When the cam 80b rotates counterclockwise by 180° (for example, with a tolerance of +/−15°), the door 40 for discharging high-temperature steam caused by completing cooking may be maximally opened by the door latch 80c and the push bar 80d. The door 40 which is maximally opened may be at a position of the door 40, at which the door 40 is capable of being closed by the weight thereof. For example, when the driving force of the motor 80a is removed from the door 40 which is maximally opened, the door 40 may be closed by the weight thereof. Also, the door 40 which is maximally opened may be at a position of the door 40 being capable of being closed by the weight thereof and the elastic force of the hinge. For example, when the driving force of the motor 80a is removed from the door 40 which is maximally opened, the door 40 may be closed by the weight thereof and the elastic force of the hinge.

Referring to FIG. 15, it may be seen that a maximum opening angle β of the door 40 based on the hinge is 5°. The maximum opening angle β of the door 40 may be 3° to 8°. Also, the maximum opening angle β of the door 40 may be 5° to 11°.

A maximum flow of the high-temperature air may be discharged through an open space between the door 40 and the front panel 11. For a preset period of time (for example, several or up to tens of minutes), the door 40 may be opened under control of the controller 300.

The controller 300 may restrict driving of the motor 80a for the preset period of time. A restricted driving time of the motor 80a may correspond to the open time of the door 40.

The controller 300 may detect whether the door 40 is opened, using a door opening or closing sensor 85a. The door opening or closing sensor 85a may be a contact sensor or a non-contact sensor. The door opening or closing sensor

85a, which is a contact sensor, may be a push type (for example, a limit switch, a micro switch, or the like). When the door opening or closing sensor 85a and the door 40 are released from contact therebetween, the door 40 may be opened. Also, when the door opening or closing sensor 85a and the door 40 come into contact with each other, the door 40 may be closed.

The door opening or closing sensor 85a, which is a non-contact sensor, may be, for example, an optical sensor, a proximity sensor, or the like. When a gap is generated between the door opening or closing sensor 85a and the door 40, the door 40 may be in an open state. When a gap is not present between the door opening or closing sensor 85a and the door 40, the door 40 may be in a closed state.

Figure 16:
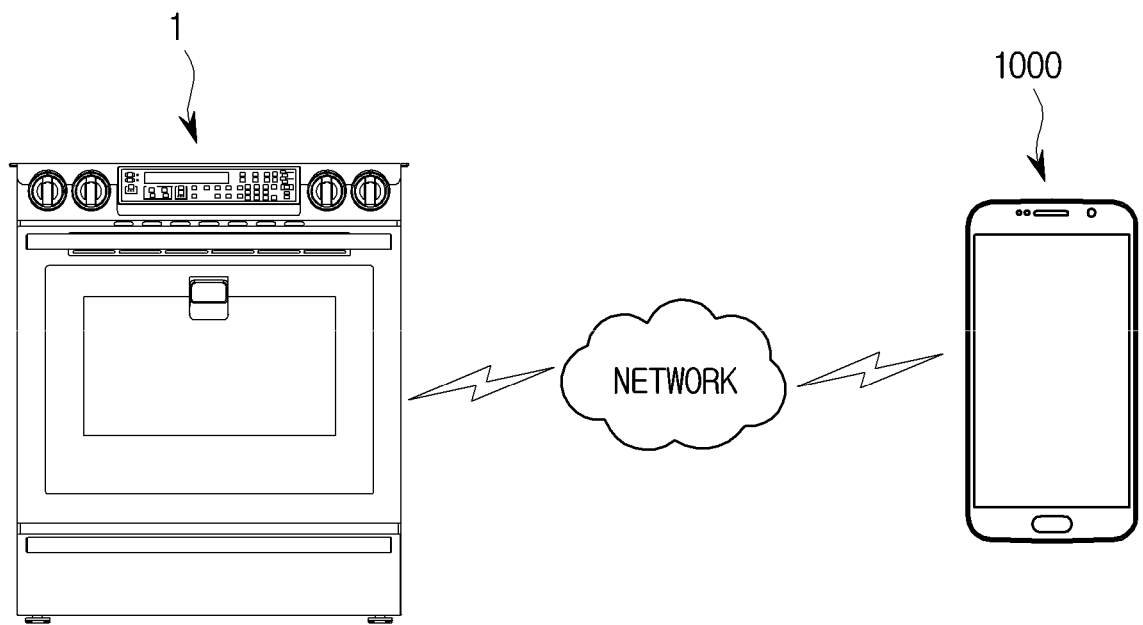
FIG. 16 is a schematic diagram of the oven and a portable device according to one embodiment of the present invention.

FIG. 16 is a schematic diagram of the oven and a portable device according to one embodiment of the present invention.

Referring to FIG. 16, the oven 1 may be wirelessly connected to a portable device 1000 through the communication portion (or the communication board) 120 of the monitoring unit 100.

The portable device 1000 may include a cellular phone (not shown), a smart phone (not shown), a table device (not shown), a laptop personal computer (PC), a computer, or a display device. It will be easily understood by one of ordinary skill in the art that the portable device 1000 may be embodied as an electronic device, in which an application capable of remotely controlling the oven 1 is installable, but is not limited thereto.

The portable device 1000 may control operations of the oven 1 (for example, start of cooking, completion of cooking, opening or closing the door, and the like) through the installed application. Also, the portable device 1000 may display an operation state of the oven 1 (for example, a state of cooking of foodstuff, and the like) through the installed application.

A network may be embodied as a wired network such as a LAN, a wide area network (WAN), a value added network (VAN), and the like or a wireless network such as a mobile radio communication network, LAN, a satellite communication network, and the like.

Figure 17:
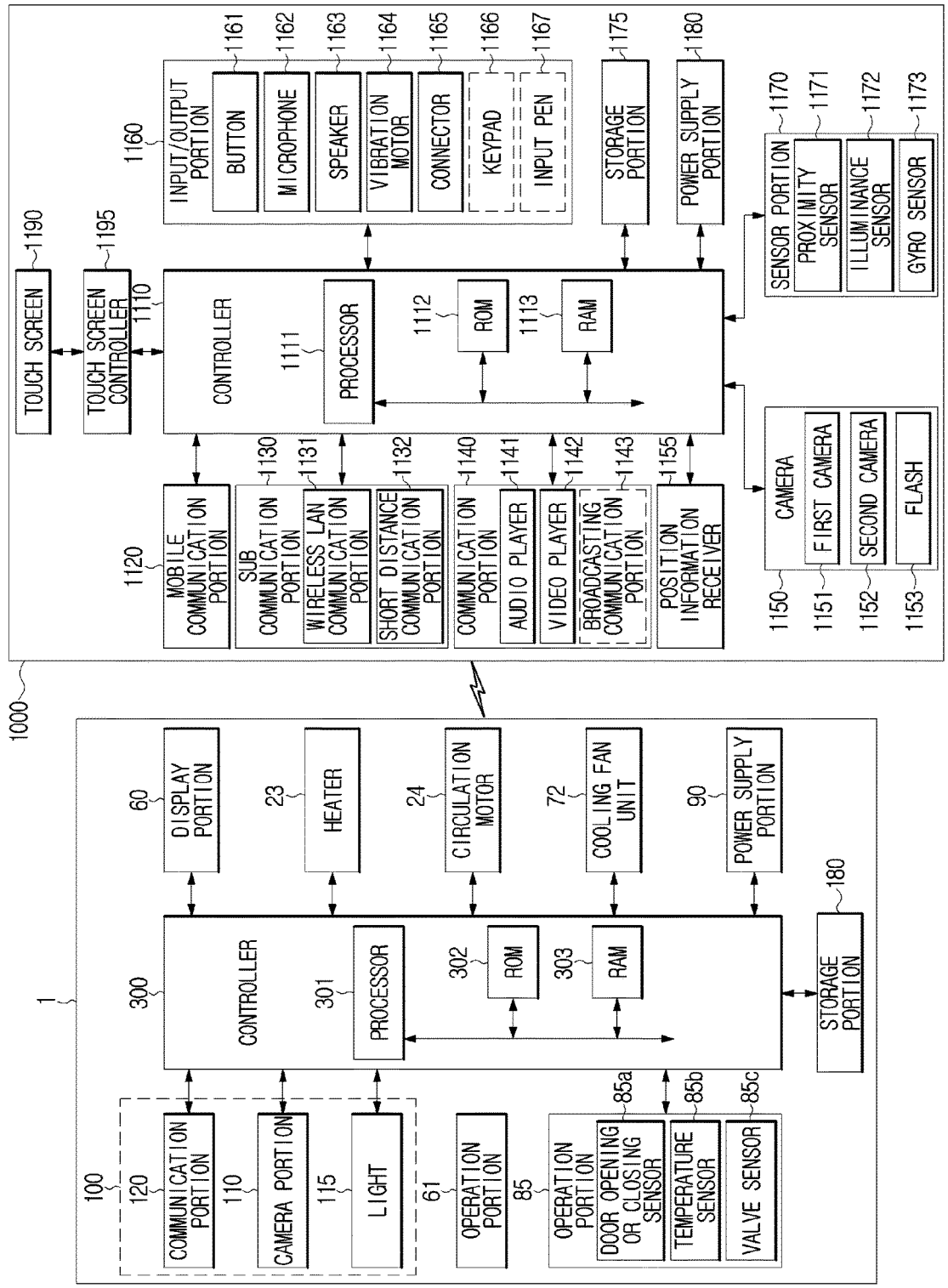
FIG. 17 is a schematic block diagram of the oven and the portable device according to one embodiment of the present invention.

FIG. 17 is a schematic block diagram of the oven and the portable device according to one embodiment of the present invention.

Referring to FIG. 17, the oven 1 may include the camera portion 110, the communication portion 120, a sensor 85, the display portion 60, a heater 22, the circulation motor 24, the cooling fan unit 72, a storage portion 180, the power supply portion 90, and the controller 300. The camera portion 110 and the communication portion 120 may be embodied as the monitoring unit 100.

The controller 300 may include a processor 301. Also, the controller 300 may further include a read-only memory (ROM) 302 in which a control program for controlling the oven 1 is stored and a random-access memory (RAM) 303 in which a signal or data input from the outside of the oven 1 is stored or which is used as a storage area for a variety of operations performed by the oven 1.

The controller 300 may correspond to one or a plurality of processors. The processor may be embodied as an array of a plurality of logic gates or may be embodied as a combination of a universal micro processor and a memory in which a program executable by the micro processor is stored. Also, the storage portion 180 and the controller 300 may be configured as a single chip.

The controller 300 performs functions of controlling overall operations of the oven 1 and a signal flow among internal components of the oven 1 (refer to FIG. 17) and processing data. The controller 300 controls power supply to the internal components (refer to FIG. 17) using the power supply portion 90.

The controller 300 may control driving of the heater 22 to allow the cooking compartment 20 to maintain a preset cooking temperature on the basis of a temperature of the cooking compartment 20 detected by the temperature sensor 85b.

The controller 300 may control the circulation motor 24 to uniformly transfer high-temperature air generated by the heater 22 to the inside of the cooking compartment 20.

The controller 300 may cool the machine room 70 by driving the cooling fan unit 72 to protect electronic components provided in the machine room 70 during cooking.

The camera portion 110 may capture an image or a video of the inside of the cooking compartment 20 under control of the controller 300. Also, the camera portion 110 may capture an image of a cooked state of foodstuff located in the cooking compartment 20 under control of the controller 300.

The camera portion 110 may transmit a captured image or video to the controller 300.

The light 115 (refer to FIG. 11) may provide an auxiliary light source necessary for the camera portion 110 to capture an image of the inside of the cooking compartment 20. The light 115 may be located at the top end of the cooking compartment 20 and may be located between the cooling fan unit 72 (refer to FIG. 3) and the front panel 11. One or a plurality of such lights 115 may be provided. The light 115 may be located to be more adjacent to the front panel 11 than the rear panel 14. A position of the light 115 may be any positions adequate for providing an auxiliary light source necessary for the camera portion 110 to capture an image of the inside of the cooking compartment 20.

The communication portion 120 may be connected to the portable device 1000 and may transmit data to or receive data from the portable device 1000. The communication portion 120 may transmit an operation or a state of the oven 1 to the portable device 1000 under control of the controller 300. The communication portion 120 may be connected to the portable device 1000 through a peer-to-peer method or an infrastructure method.

The communication portion 120 may transmit information corresponding to start and completion of cooking of the oven 1 to the portable device 1000. Also, the communication portion 120 may receive a control command corresponding to an operation of the oven 1 (for example, door-opening according to the cooking completion) from the portable device. Also, the communication portion 120 may transmit an image or video corresponding to a state of foodstuff which is being cooked to the portable device 1000 under control of the controller 300.

The operation portion 61 may be located on the front surface of the oven 1 and may receive user input. The operation portion 61 may be embodied as at least one of input means such as a push button, a membrane button, a dial, a slider switch, and the like but is not limited thereto.

The operation portion 61 may include a knob capable of operating the cook-top 30 of the oven 1. When the cook-top 30 is not present in the oven 1, the operation portion 61 may be embodied corresponding to an operation for another function, which is not the cook-top 30.

The sensor 85 may detect a state of the oven 1. For example, the sensor 85 may include at least one of the door opening or closing sensor 85a, the temperature sensor 85b, and a valve sensor 85c.

The door opening or closing sensor 85a may detect opening or closing of the door 40.

The temperature sensor 85b may detect a temperature of the inside of the cooking compartment 20. The temperature sensor 85b may include one of a thermoresistor thermometer, a thermistor thermometer, a thermocouple thermometer, and an IC thermometer but is not limited thereto.

The valve sensor 85c may detect whether a flow path is closed.

The display portion 60 may be located above the front panel 11, may display operation information and state information, and may receive a user command for operating the oven 1.

The display portion 60 may be embodied as a display means such as a plasma display panel (PDP), a liquid crystal display (LCD) panel, a light emitting diode (LED) panel, an organic light emitting diode (OLED) panel, an active-matrix OLED (AMOLED) panel, a curved display panel, and the like but is not limited thereto.

The display portion 60 may be embodied as a touch screen which further includes a touch input means configured to sense user contact. When the display portion 60 is embodied as a touch screen, a user may receive user input (for example, a touch and the like) through the touch screen.

The heater 22 may heat the cooking compartment 20 under control of the controller 300. When the user selects a cooking-start button 60a in the display portion 60, the heater 22 may heat the inside of the cooking compartment 20.

The circulation motor 24 may allow high-temperature air heated by the heater 22 to flow through the inside of the cooking compartment 20 under control of the controller 300. The circulation motor 24 may form a fluid convection current (for example, high-temperature air) using the circulation fan 25 and uniformly heat the inside of the cooking compartment 20. Driving timing of the circulation motor 24 may be equal to driving timing of the heater 22 but is not limited thereto.

The cooling fan unit 72 may discharge outside air around the cooking compartment 20, which is heat-exchanged with heated high-temperature air in the cooking compartment 20, toward the front of the oven 1 under control of the controller 300. Also, the cooling fan unit 72 may blow air for cooling the machine room 70 using the cooling fan (not shown) driven by the cooling motor (not shown), and air suctioned by the cooling fan unit 72 may be discharged frontward from the oven 1 through the cooling flow path 73.

The storage portion 180 may store signals or data input/output corresponding to operations of the camera portion 110, the communication portion 120, the sensor 85, the display portion 60, the heater 22, the circulation motor 24, the cooling fan unit 72, the power supply portion 90, and the controller 300 under control of the controller 300. The storage portion 180 may store a control program for controlling of the oven 1 or the controller 300, a graphical user interface (GUI) related to an application provided by a manufacturer or downloaded from the outside, images for providing the GUI, user information, documents, databases, or related data.

The storage portion 180 may store cooking information of foodstuff. The cooking information means a method of properly cooking foodstuff and may include at least one of a preheating temperature of the cooking compartment 20, a cooking temperature of the cooking compartment 20, and a cooking guide time.

The cooking guide time may include a minimum cooking time estimated to be necessary for cooking foodstuff and a maximum cooking time for preventing foodstuff from burning. The minimum cooking time and the maximum cooking time of foodstuff may be determined by the cooking guide time. Since a suitable cooking method may be different for each type of foodstuff, the cooking information may be provided for each type of foodstuff.

The storage portion 180 may store an image or video captured by the camera portion 110.

The storage portion 180 may include a high-speed RAM, magnetic disk, static RAM (SRAM), dynamic RAM (DRAM), ROM, and the like but is not limited thereto. The storage portion 180 may be attachable to and detachable from a device. For example, the storage portion 180 may include a compact flash (CF) card, a secure digital (SD) card, a smart media (SM) card, a multimedia card (MMC), or a memory stick but is not limited thereto.

The power supply portion 90 may supply power to the components (refer to FIG. 17) located in the oven 1 under control of the controller 300. The power supply portion 90 may supply power input from an external power source (not shown) through a power cable (not shown) to the components of the oven 1 under control of the controller 300.

It will be easily understood by one of ordinary skill in the art that at least one of the components of the oven 1 shown in FIG. 17 may be added, deleted, or changed corresponding to performance of the oven 1.

Referring to FIG. 17, the portable device 1000 may be connected to the oven 1 or another apparatus (for example, a wearable apparatus) wirelessly or through wires through a mobile communication portion 1120, a sub communication portion 1130, and a connector 1165.

The portable device 1000 may mean a device in which an application capable of remotely controlling the oven 1 is installable. For example, the portable device 1000 may include a cellular phone (not shown), a smart phone (not shown), a tablet device (not shown), an MP3 player (not shown), a video player (not shown), a monitor (not shown), an electronic apparatus (for example, a refrigerator, a washing machine, an air conditioner, or the like) which includes a display and in which an application capable remotely controlling the oven 1 is installable, a display device (not shown) in which an application capable of remotely controlling the oven 1 is installable, or the like.

It will be easily understood by one of ordinary skill in the art that the display device may be embodied as an analog TV, a digital TV, a 3D-TV, a smart TV, an LED TV, an OLED TV, a plasma TV, a curved TV having a fixed-curvature screen, a flexible TV having a fixed-curvature screen, a bended TV having a fixed-curvature screen, a curvature-variable TV with a curvature screen changeable by a user input, and/or the like but is not limited thereto.

A controller 1110 may include a processor 1111. Also, the controller 1110 may further include an ROM 1112 in which a control program for controlling the portable device 1000 is stored and a RAM 1113 in which a signal or data input from the outside of the portable device 1000 is stored or which is used as a storage area for a variety of operations performed by the portable device 1000.

The controller 1110 performs functions of controlling overall operations of the portable device 1000 and a signal flow among internal components 1200 to 1950 of the portable device 1000 and processing data. The controller 1110 controls power supply to the internal components 1110 to 1195 using a power supply portion 1800.

The processor 1111 may include a graphic processing unit (GPU, not shown) for processing graphics. Also, the processor 1111 may include a sensor processor (not shown)

configured to control a sensor or a communication processor (not shown) configured to control communication.

The processor 1111 may be embodied as a system on chip (SoC) which includes a core (not shown) and the GPU (not shown). The processor 1111 may include a single core, a dual core, a triple core, a quad core, and a multiple core. Also, the processor 1111, the ROM 1112, and the RAM 1113 may be mutually connected using a bus.

The mobile communication portion 1120 may connect the oven 1 or another device (for example, another portable device, server, or the like) using one or two or more antennas through a mobile communication network under control of the controller 1110. The mobile communication portion 1120 may receive oven operation information or information (for example, a cooking image or video of foodstuff) from the oven 1 under control of the controller 1110. The received oven operation information or other information (for example, a cooking image or video of foodstuff) may be stored in a storage portion 1175 under control of the controller 1110.

The sub communication portion 1130 may connect the oven 1 or another device (for example, another portable device, server, or the like) using a wireless LAN communication portion 1131 or a short-distance communication portion 1132 under control of the controller 1110. The sub communication portion 1130 may transmit or receive oven operation information or other information (for example, a cooking image or video of foodstuff) to or from the oven 1 under control of the controller 1110. The oven operation information or other information (for example, a cooking image or video of foodstuff) may be stored in the storage portion 1175 under control of the controller 1110.

The wireless LAN communication portion 1131 may be wirelessly connected to an access point (AP) at a position in which the AP is installed under control of the controller 1110. The wireless LAN communication portion 1131 may include, for example, Wi-Fi.

The short-distance communication may include Bluetooth, Bluetooth low energy, infrared data association (IrDA), UWB, NFC, and/or the like.

In the embodiment of the present invention, the term a communication portion of a portable device may include the mobile communication portion 1120 and/or the sub communication portion 1130.

A multimedia portion 1140 may receive external broadcasting and play an audio and/or video under control of the controller 1110. The multimedia portion 1140 may include an audio player 1141, a video player 1142, and/or a broadcasting communication portion 1143.

A camera 1150 may capture an image or video under control of the controller 1110. The camera 1150 may include at least one of a first camera 1151 in front and a second camera 1152 in the rear. Also, the first camera 1151 or the second camera 1152 may include an auxiliary light source (for example, a flash 1153) configured to provide an amount of light necessary for capturing an image.

A position information receiver (Global Positioning System, GPS) 1155 may periodically receive signals (for example, orbit information of a GPS satellite, time information of a satellite, a navigation message, and the like) from a plurality of satellites (not shown) on the earth's orbit.

An input/output portion 1160 may include at least one of one or two or more buttons 1161, one or two or more microphones 1162, one or two or more speakers 1163, one or two or more vibration motors 1164, the connector 1165, a keypad 1166, and an input pen 1167.

A sensor portion 1170 may detect a state of the portable device 1000 and/or an ambient state of the portable device 1000. The sensor portion 1170 may include one or a plurality of sensors. The sensor portion 1170 may include a proximity sensor 1171 configured to detect whether a user approaches the portable device 1000, an illuminance sensor 1172 configured to detect an amount of ambient light of the portable device 1000, and/or a gyro sensor 1173 configured to detect a fingerprint of a user who uses the portable device 1000.

The storage portion 1175 may store signals or data input/output corresponding to operations of the mobile communication portion 1120, the sub communication portion 1130, the multimedia portion 1140, the camera 1150, a GPS 1155, the input/output portion 1160, the sensor portion 1170, and a touch screen 1190. The storage portion 1175 may store a control program for controlling of the portable device 1000 or the controller 1110, a GUI related to an application provided by a manufacturer or downloaded from the outside, images for providing the GUI, user information, documents, databases, or related data.

The storage portion 1175 may store oven operation information or other information (for example, a cooking image of foodstuff or a cooking video of foodstuff) received from the oven 1.

The storage portion 1175 may store first user input information corresponding to a selection of the cooking-start button 60a (refer to FIG. 20a), second user input information corresponding to a selection of automatically opening the door when cooking is completed, or third user input information corresponding to a selection of automatically closing the door.

The power supply portion 1180 may supply power to the components 1110 to 1195 located in the portable device 1000 under control of the controller 1110. The power supply portion 1180 may supply power input from an external power source (not shown) through a cable (not shown) connected to the connector 1165, to the components of the portable device 1000 under control of the controller 1110.

The power supply portion 1180 may supply power to one or two or more batteries (not shown) to charge under control of the controller 1110.

The touch screen 1190 may provide GUIs corresponding to a variety of services (for example, voice communication, video communication, data transmission, broadcasting reception, image-capturing, viewing of videos, or executing of applications). The touch screen 1190 may include an edge touch panel (not shown) configured to receive touch input and an edge display panel (not shown) for displaying a screen.

A touch screen controller 1195 converts an analog signal corresponding to a single touch or a multiple touch received from the edge touch screen 1190 into a digital signal and transmits the digital signal to the controller 1110. The controller 1110 may calculate an X coordinate and a Y coordinate corresponding to a touch position of a touch input at the edge touch screen 1190 using the digital signal received from the touch screen controller 1195.

It will be easily understood by one of ordinary skill in the art that at least one of the components of the portable device 1000 shown in FIG. 17 may be added, deleted, or changed corresponding to performance of the portable device 1000.

FIG. 18 is a schematic flowchart illustrating a method of opening or closing the door of the oven according to one embodiment of the present invention.

FIG. 19 is a schematic flowchart illustrating a method of opening or closing the door of the oven from the portable device according to one embodiment of the present invention.

FIGS. 20a to 20f are schematic diagrams illustrating an example of the method of automatically opening or closing the door of the oven according to one embodiment of the present invention.

In operation S1810 of FIG. 18, the portable device is wirelessly connected.

In operation S1910 of FIG. 19, the oven is wirelessly connected.

Referring to FIGS. 18 to 20a, the oven 1 and the portable device 1000 are connected wirelessly (for example, through LAN).

A user may install a remote control application in the portable device 1000 for remotely controlling the oven 1. The user may wirelessly connect the portable device 1000 to the oven 1 using connection settings of the installed application (for example, a GUI (not shown) of the application or the like). The connection settings may include a selection of an AP connectable to the oven 1 or a selection of the oven 1 as an object of remote control using identification information of the oven 1 (for example, an IP address, MAC, and the like) of the oven 1.

The user may wirelessly connect the connectable portable device 1000 using the oven 1. The user may wirelessly connect the oven 1 with the portable device 1000 using the connection settings (for example, the GUI (not shown) of the oven and the like) of the oven 1.

A method of wirelessly connecting the oven 1 with the portable device 1000 will be easily understood by one of ordinary skill in the art.

In operation S1820 of FIG. 18, input of the cooking-start button is received at the oven.

Referring to FIGS. 18 to 20a, a selection of the cooking-start button is received at the oven 1 from the user.

The user closes the door 40 with foodstuff being disposed on a rack 23 of the cooking compartment 20 of the oven 1. The user selects the cooking-start button 60a on the display portion 60. Also, the user may select the cooking-start button 60a and may additionally select a remote control button (not shown).

The controller 300 may receive the selection of the user for the cooking-start button 60a.

The controller 300 may store cooking-start button selection information corresponding to the selection of the cooking-start button 60a. The stored cooking-start button selection information may include a cooking-start button selection identifier (ID), a cooking-start button selection time, and the like for history management.

First control information (for example, transmitted to the portable device) corresponding to the cooking-start button selection of the controller 300 may be generated. The controller 300 may generate the first control information using the stored cooking-start button selection information. Also, the controller 300 may load prestored first control information corresponding to the cooking-start button selection (or cooking-start button selection information).

In operation S1830 of FIG. 18, the first control information corresponding to a start of cooking is transmitted to the portable device.

In operation S1920 of FIG. 19, the first control information corresponding to the start of cooking is received from the oven.

Referring to FIGS. 18 and 19, the controller 300 of the oven 1 may transmit the first control information to the portable device 1000 through the communication portion 120. Also, the portable device 1000 may receive the first control information transmitted from the oven 1 through the communication portion. Also, the controller 1110 may store the received first control information in the storage portion 1175.

In operation S1930 of FIG. 19, an application corresponding to the first control information is executed.

Figure 20B:
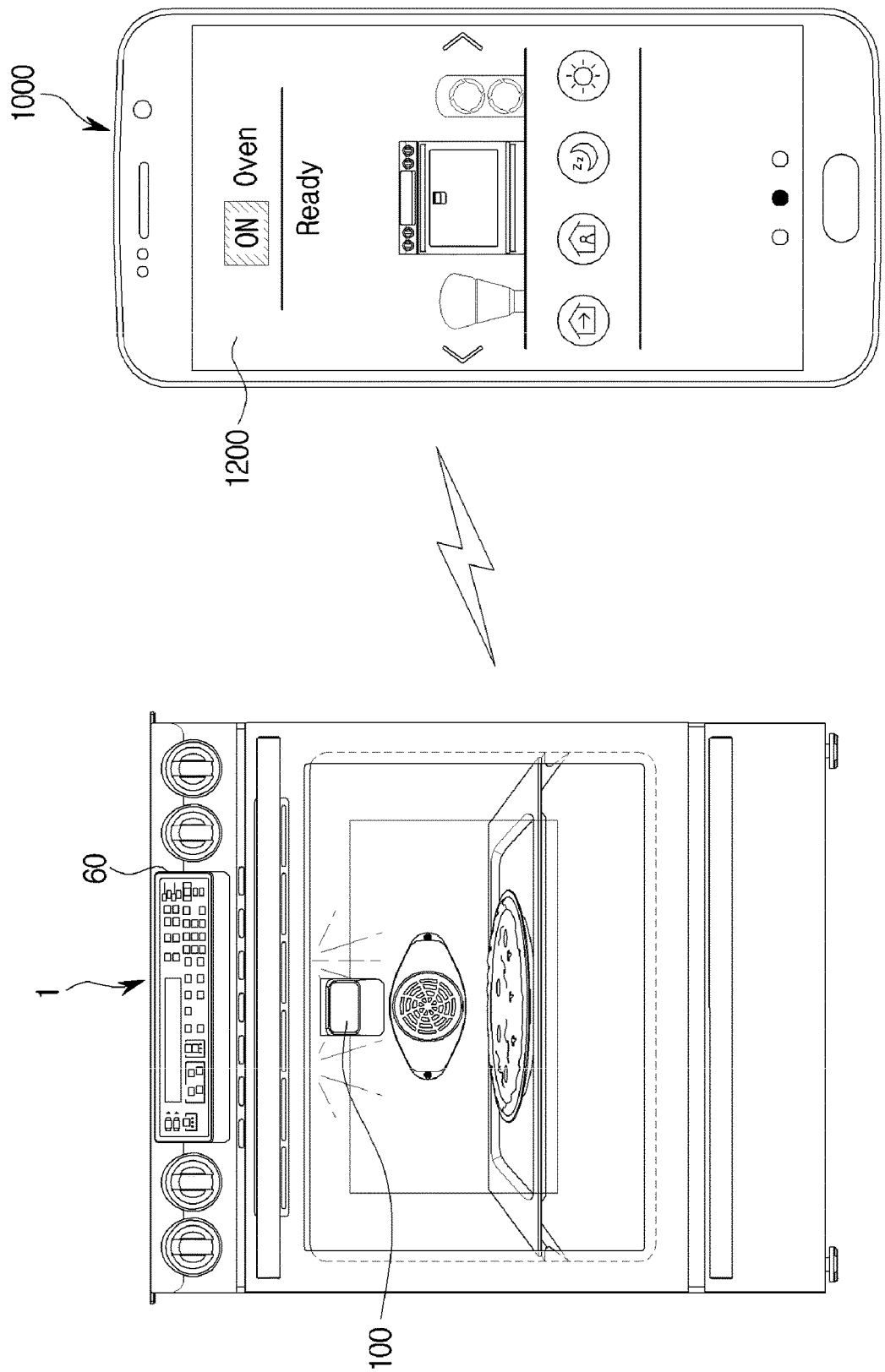
Figure 20C:
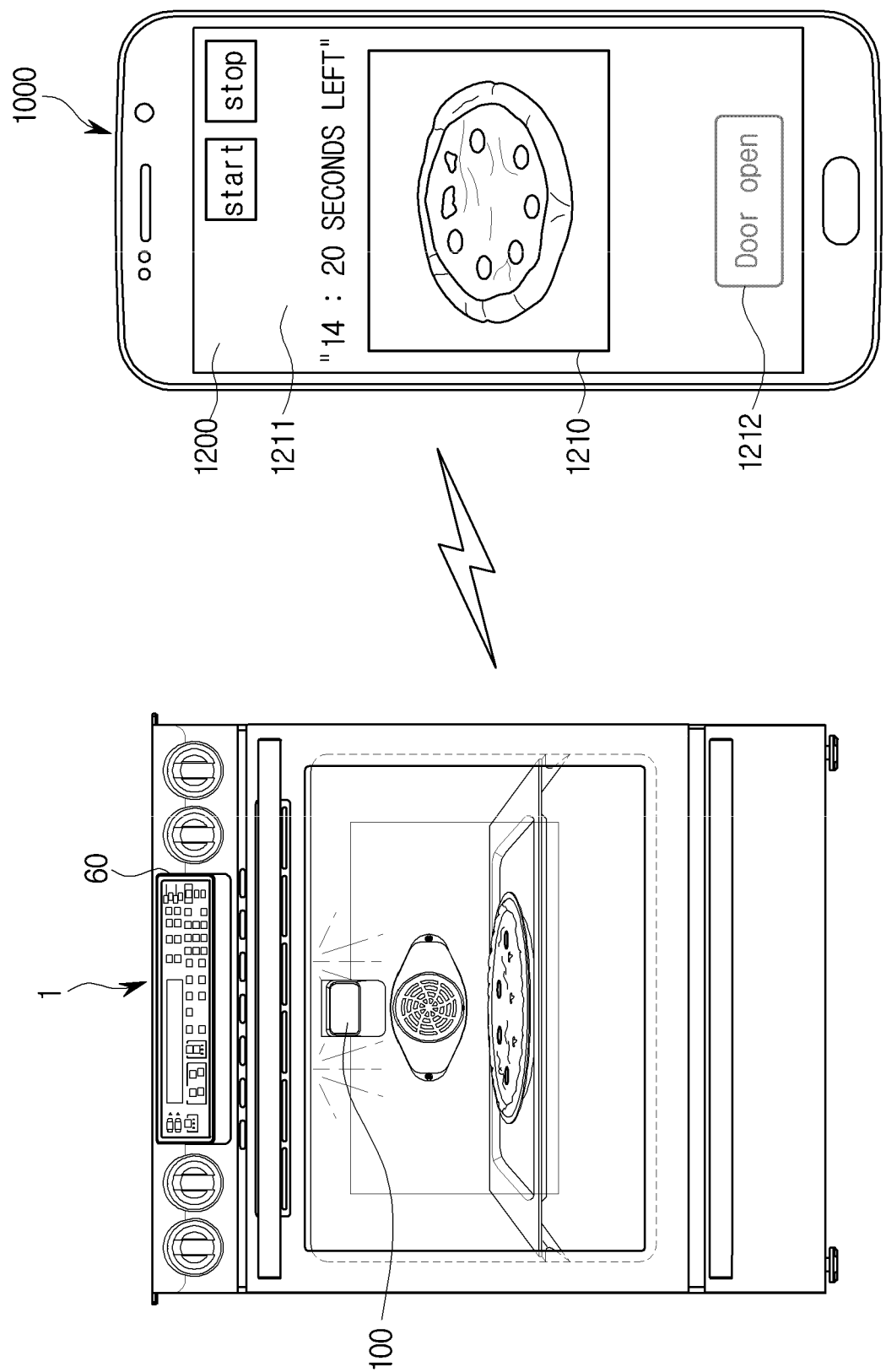

Referring to FIGS. 19 and 20b, the controller 1110 of the portable device 1000 may analyze the selection of the cooking-start button of the oven 1 using the received first control information. Also, the controller 1110 may analyze the selection of the cooking-start button of the oven 1 and a selection of the remote control button using the received first control information.

The controller 1110 may execute and display an application 1200 configured to remotely control the oven 1 on the touch screen 1190 corresponding to the reception of the first control information.

The portable device 1000 may control operations of the oven 1 (for example, the cooking start, cooking completion, opening or closing the door, and the like) through the installed application 1200. Also, the portable device 1000 may display an operation state of the oven 1 (for example, a state of cooking of foodstuff, and the like) through the installed application 1200.

In operation S1840 of FIG. 18, one of a video and image captured corresponding to the cooking start is transmitted to the portable device.

In operation S1940 of FIG. 19, one of the video and image received from the oven is displayed.

Referring to FIGS. 18, 19, 20b, and 20c, the controller 300 of the oven 1 may turn on the light 115 and may start cooking of foodstuff corresponding to the cooking start. The controller 300 may capture an image of the inside of the cooking compartment 20 lit by the light 115 through the camera portion 110.

The camera portion 110 may capture one of a video and image of the inside of the cooking compartment 20 according to settings. The camera portion 110 may periodically capture one of a video and image of the inside of the cooking compartment 20 on the basis of the settings according to the entire cooking time or a preset image-capturing interval (for example, an interval of 20 seconds, changeable).

The camera portion 110 may periodically capture a video of the inside of the cooking compartment 20 on the basis of the settings for a preset image-capturing time (for example, 10 seconds, changeable).

The controller 300 may transmit one of the captured video and image to the portable device 1000 through the communication portion 120. Also, the controller 300 may send a residual cooking time as well as one of video and image.

Since a detailed description on transmission of the captured video and image from the controller 300 to the portable device 1000 through the communication portion 120 will be easily understood by one of ordinary skill in the art, the description will be omitted.

In another embodiment of the present invention, the controller 300 may analyze a cooking advancement rate of foodstuff (for example, 30% of cooking has been done) using the video and image captured by the camera portion 110. Also, the controller 300 may analyze the cooking advancement rate of foodstuff (for example, 30% of cooking has been done) using the camera portion 110 and a smoke sensor (not shown).

When the analyzed cooking advancement rate of foodstuff reaches a preset reference (for example, 80% of cooking has been done), the controller 300 may transmit the cooking advancement rate as well as one of the captured video and image to the portable device 1000 through the communication portion 120. Also, the controller 300 may send the cooking advancement rate and the residual cooking time as well as one of video and image.

In another embodiment of the present invention, the controller 300 may detect a position of the rack 23 located in the cooking compartment 20 using the video and image captured by the camera portion 110. Also, the controller 300 may detect the position of the rack 23 located in the cooking compartment 20 using the camera portion 110 or a range sensor (not shown).

The controller 300 may apply an algorithm adequate for cooking foodstuff corresponding to the position of the rack 23 located in the cooking compartment 20. Also, the controller 300 may transmit a notification corresponding to the position of the rack 23 located in the cooking compartment 20 to the portable device 1000 through the communication portion 120.

When the position of the rack 23 in the cooking compartment 20 is detected, the controller 300 may transmit the position of the rack 23 as well as one of the captured video and image to the portable device 1000 through the communication portion 120. Also, the controller 300 may send the position of the rack 23 and a residual cooking time as well as one of video and image.

The controller 1110 of the portable device 1000 may display the received one of video and image in a monitoring area 1210 of the application 1200. The controller 1110 may change a size of the received one of video and image to be equal to a size of the monitoring area 1210.

The controller 1110 may display a received residual cooking time 1211 in the vicinity of the monitoring area 1210. The residual cooking time may be received from the oven 1 with the received one of video and image. The residual cooking time 1211 may be changed according to cooking advancement of foodstuff.

The controller 1110 may display a notification corresponding to the received cooking advancement (for example, 80% of cooking has been done, not shown) on an additional popup screen (not shown) separate from the monitoring area 1210.

A door-opening button 1212 selectable by the user may be displayed on one side (for example, a top end or a bottom end) of the monitoring area 1210.

When foodstuff is being cooked, the displayed door-opening button 1212 may be inactivated.

While the camera portion 110 captures an image of the inside of the cooking compartment 20 (for example, foodstuff is being cooked), the door 40 of the oven 1 may be opened. While the camera portion 110 captures an image of the inside of the cooking compartment 20 (for example, foodstuff is being cooked), which is lit by the light 115, the user may open the door 40 of the oven 1.

The controller 300 may detect whether the door 40 is opened, using the door opening or closing sensor 85a. The door opening or closing sensor 85a may transmit an electrical signal corresponding to a contact release between the door opening or closing sensor 85a and the door 40, to the controller 300.

When opening of the door 40 is detected, the controller 300 may control such that image-capturing of the camera portion 110 is temporarily stopped. A temporary stop of image-capturing of the camera portion 110 may be maintained until the door 40 is closed.

When the opening of the door 40 is detected, the controller 300 may transmit control information (for example, 1-1 control information) corresponding to the opening of the door 40 to the portable device 1000 through the communication portion 120.

When the 1-1 control information is transmitted to the portable device 1000, the controller 300 may temporarily stop transmission of the captured one of video and image to the portable device 1000 through the communication portion 120. The transmission of 1-1 control information to the portable device 1000 and the temporary stop of transmission of the captured one of video and image may coincide or may be sequentially performed (regardless of order).

The controller 300 may detect closing of the door 40 using the door opening or closing sensor 85a. The door opening or closing sensor 85a may transmit an electrical signal corresponding to contact between the door opening or closing sensor 85a and the door 40, to the controller 300.

When closing of the door 40 is detected by the door opening or closing sensor 85a, the controller 300 may resume image-capturing of the camera portion 110, which has been temporarily stopped. Also, when closing of the door 40 is detected by the door opening or closing sensor 85a, the controller 300 may turn on the light 115 which has been turned off.

When the closing of the door 40 is detected, the controller 300 may transmit control information (for example, 1-2 control information) corresponding to the closing of the door 40 to the portable device 1000 through the communication portion 120.

When the 1-2 control information is transmitted to the portable device 1000, the controller 300 may resume transmission of the captured one of video and image to the portable device 1000 through the communication portion 120.

In operation S1850 of FIG. 18, second control information corresponding to cooking completion is transmitted to the portable device.

In operation S1950 of FIG. 19, the second control information corresponding to the cooking completion is received from the oven.

Figure 20D:
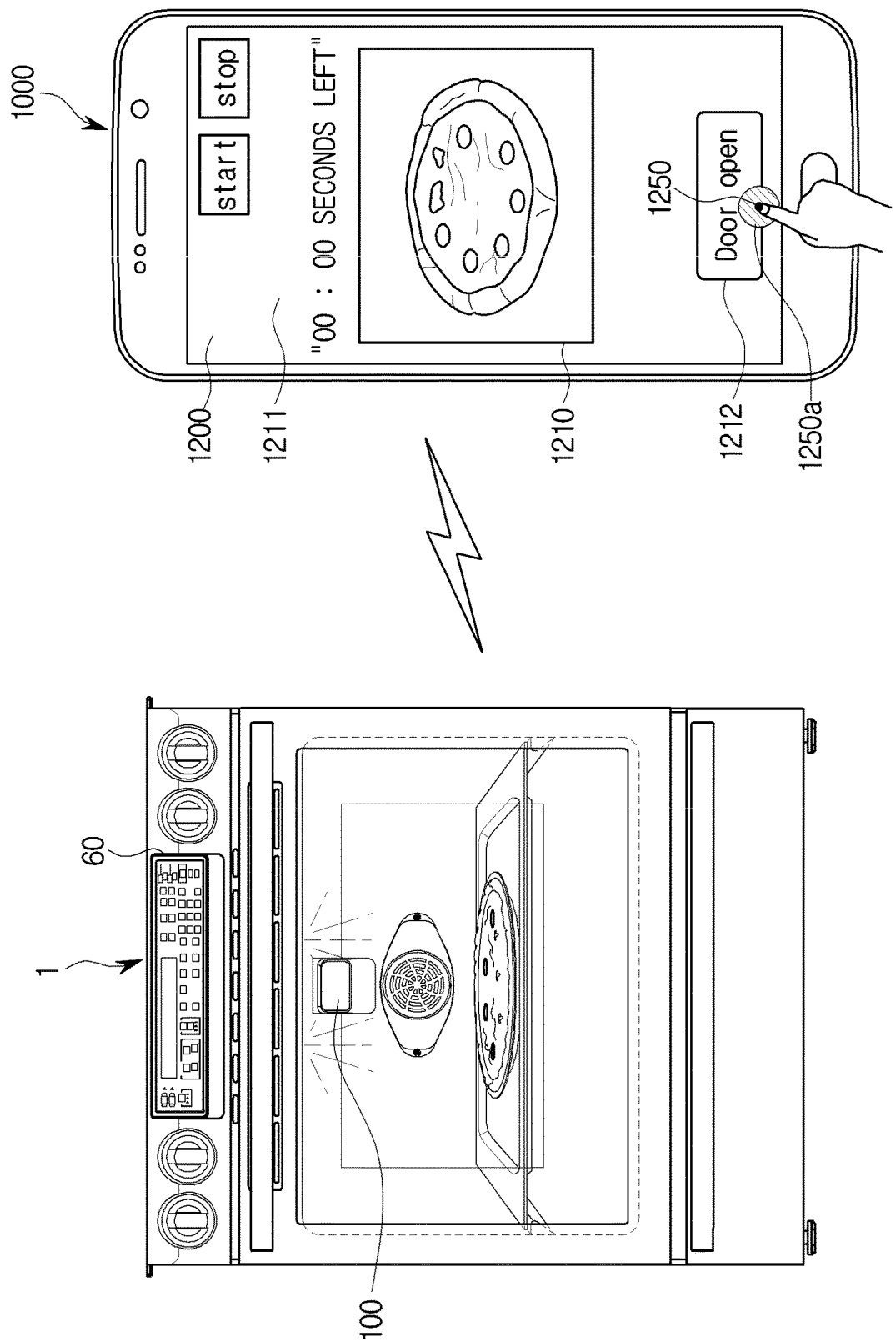

Referring to FIGS. 18, 19, and 20d, cooking of foodstuff in the oven 1 is completed. Since determination of the controller 300 on whether foodstuff is completely cooked may be easily understood by one of ordinary skill in the art, a detailed description thereof will be omitted.

When the cooking of foodstuff disposed in the cooking compartment 20 in the oven 1 is completed, the controller 300 may transmit the second control information corresponding to the cooking completion to the portable device 1000 through the communication portion 120.

When the cooking of foodstuff disposed in the cooking compartment 20 in the oven 1 is completed, the controller 300 may complete image-capturing of the inside of the cooking compartment 20 using the camera portion 110.

In another embodiment of the present invention, when the cooking of foodstuff disposed in the cooking compartment 20 in the oven 1 is completed, the controller 300 may maintain image-capturing of the inside of the cooking compartment 20 using the camera portion 110 until third control information corresponding to a selection of the door-opening button is received.

The controller 300 may transmit one of a video and image captured after the cooking of foodstuff disposed in the cooking compartment 20 in the oven 1 is completed to the portable device 1000 through the communication portion 120.

The controller 1110 of the portable device 1000 may receive the transmitted second control information through the communication portion.

The controller 1110 of the portable device 1000 may analyze that cooking of the oven 1 is completed using the received second control information. The controller 1110 may store the received second control information in the storage portion 1175.

In operation S1960 of FIG. 19, the door-opening button is activated corresponding to the reception of the second control information.

Referring to FIGS. 19 and 20e, the controller 1110 may activate the door-opening button 1212 displayed adjacent to the monitoring area 1210 corresponding to the reception of the second control information.

The controller 1110 may change the residual cooking time 1211 displayed adjacent to the monitoring area 1210 to be "00:00 left" corresponding to the reception of the second control information.

The controller 1110 may provide a user with an auditory feedback (for example, an alarm) through a speaker 163 or a tactile feedback (for example, vibrations) through a vibration motor 164 for user recognition corresponding to the reception of the second control information.

In operation 1970 of FIG. 19, the third control information corresponding to the selection of the door-opening button of the user may be transmitted to the oven.

In operation S1860 of FIG. 18, the third control information corresponding to door opening is received from the portable device.

Referring to FIGS. 18, 19, and 20d, the user performs a first touch (or hovering) 1250 on the door-opening button 1212.

The controller 1110 may detect the first touch 1250 using the touch screen 1190 and the touch screen controller 1195.

The first touch 1250 detected by the touch screen 1190 may be generated by, for example, one of fingers including a thumb or a touch of a touchable input pen 167 (for example, by contact or hovering). Also, the first touch 1250 may be generated by one of a left hand and a right hand.

The controller 1110 may calculate a first touch position 1250a (for example, X1 and Y1 coordinates) corresponding to the first touch 1250 using an electrical signal received from the touch screen controller 1195.

The controller 1110 may store first touch position information corresponding to the first touch position 1250a in the storage portion 1175. The stored first touch position information may include a touch ID, a touch position, a touch detection time, or touch information (for example, touch input, a touch direction, a touch maintenance time, and the like) for history management.

The controller 1110 may generate the third control information using the stored first touch position information. Also, the controller 1110 may load the third control information using the first touch 1250. In the present invention, the third control information may be a control signal to open the door 40.

The controller 1110 may transmit the third control information to the oven 1 through the communication portion.

When the first touch is not received for a preset time (for example, 3 minutes, changeable by settings), the controller 1110 may transmit the third control information to the oven 1 through the communication portion.

The controller 300 of the oven 1 may receive the third control information transmitted from the portable device 1000 through the communication portion 120. The received third control information may be stored in the storage portion 180 under control of the controller 300.

In operation S1870 of FIG. 18, the door is opened corresponding to the received third control information.

Referring to FIGS. 18 and 20e, the door 40 of the oven 1 is opened.

The controller 300 may analyze the received third control information. The controller 300 may open the closed door 40 corresponding to the reception of the third control information.

The controller 300 may drive the motor 80a corresponding to opening of the door. The door 40 having the weight may be opened by the cam 80b which circularly moves due to driving of the motor 80a and the door latch 80c and the push bar 80d which linearly move corresponding to the circular movement of the cam 80b.

High-temperature air in the cooking compartment 20 may be discharged outward from the cooking compartment 20 by opening of the door 40. The high-temperature air in the cooking compartment 20 may be more discharged outward from the cooking compartment 20 according to an opening degree of the door 40 (for example, an opening angle β of the door).

Opening of the door 40 may be detected by the sensor 85a.

When the opening of the door 40 is detected by the sensor 85a, the controller 300 may transmit fourth control information corresponding to the opening of the door 40 to the portable device 1000.

Referring to FIGS. 20e and 20f, the controller 1110 of the portable device 1000 may display a door-closing button 1212a corresponding to the received fourth control information. Also, the air is completely discharged from the oven 1 from which the high-temperature air is being discharged, the controller 1110 may activate the door-closing button 1212a.

The user may close the opened door 40 of the oven 1 using the door-closing button 1212a. Also, the user may close the opened door 40 of the oven 1, from which the high-temperature air is being discharged, using the door-closing button 1212a.

When the high-temperature air is completely discharged, the controller 300 may transmit fifth control information corresponding to discharge completion, to the portable device 1000.

Referring to FIGS. 20e and 20f, the controller 1110 of the portable device 1000 may display the door-closing button 1212a corresponding to the received fifth control information.

The user may perform a second touch 1251 (or hovering) on the door-closing button 1212a. The controller 1110 may detect the second touch 1251 using the touch screen 1190 and the touch screen controller 1195.

Since the second touch 1251 detected by the touch screen 1190 is substantially similar to the first touch 1250 detected by the touch screen 1190 (for example, a difference in touch), a repeated description will be omitted.

The controller 1110 may calculate a second touch position 1251a (for example, X2 and Y2 coordinates) corresponding to the second touch 1251 using an electrical signal received from the touch screen controller 1195.

The controller 1110 may store second touch position information corresponding to the second touch position 1251a in the storage portion 1175. The stored second touch position information may include a touch ID, a touch position, a touch detection time, or touch information (for example, touch pressure, a touch direction, a touch maintenance time, and the like) for history management.

The controller 1110 may generate sixth control information using the stored second touch position information. Also, the controller 1110 may load the sixth control information using the second touch position information.

The controller 1110 may transmit the sixth control information to the oven 1 through the communication portion.

The controller 300 of the oven 1 may receive the sixth control information transmitted from the portable device 1000 through the communication portion 120. The received sixth control information may be stored in the storage portion 180 under control of the controller 300.

Referring to FIG. 20*f*, the door 40 of the oven 1 is closed.

The controller 300 may analyze the received sixth control information. The controller 300 may close the opened door 40 corresponding to the reception of the sixth control information.

The controller 300 may drive the motor 80*a* corresponding to closing of the door. The door 40 having the weight may be closed by the cam 80*b* which circularly moves due to driving of the motor 80*a* and the door latch 80*c* and the push bar 80*d*, which linearly move corresponding to the circular movement of the cam 80*b*.

Closing of the door 40 may be detected by the sensor 85*a*.

In the embodiment of the present invention, opening or closing of the door 40 may be performed by a control signal received from the portable device 1000. In another embodiment of the present invention, opening or closing of the door 40 may be performed by a user selection (not shown) with respect to a door opening or closing button (not shown) displayed on the display portion 60 of the oven 1.

In another embodiment of the present invention, when a control signal corresponding to opening of the door is not received from the portable device 1000 for a preset time (for example, 3 minutes, changeable) or the user selection (not shown) with respect to the door opening or closing button displayed on the display portion 60 is not received, opening or closing of the door 40 may be performed according to settings of the controller 300 (for example, non-reception of the control signal and user selection for the preset time).

In operation S1870 of FIG. 18, when the door 40 is opened or closed, the method of opening or closing the oven is completed.

Although the present invention has been described with particular items such as detailed components and limited embodiments, and the drawings in the present application, these are provided for helping in a more overall understanding of the present application such that the present invention is not limited to the above-described embodiments and may be variously modified and changed from the above description by one of ordinary skill in the art.

Accordingly, the concept of the present invention is not limited to the above-described embodiments and the following claims and equivalents thereof will be included in the scope of the present invention.

The invention claimed is:

1. An oven comprising:
   a case;
   a cooking compartment formed in the case and configured to accommodate object;
   a door to open or close the cooking compartment, the door comprising an opening formed therein and a transparent part to cover the opening;
   a camera mounted to the door and configured to capture an image of an inside of the cooking compartment through the transparent part;
   a communicator connectable to an portable device and exchange control information with the portable device when connected to the portable device;
   a door operator configured to open or close the door; and
   a controller configured to control the camera, the communicator, and the door operator,
   wherein the controller controls the communicator to transmit one of a moving image or still image captured using the camera to the portable device, and
   wherein the controller controls the door operator to open or close the door using the control information received through the communicator.

2. The oven of claim 1, wherein the door operator comprises a motor, a cam driven by the motor, a door latch connected to the cam and configured to be linearly moved by the cam, and a push bar connected to the door latch and configured to come into contact with the door.

3. The oven of claim 1, wherein the controller controls the door operator to open the door to an angle at which the door is closable by a weight of the door and an elastic force of a hinge.

4. The oven of claim 1, wherein the door operator is located to be more adjacent to a side surface of the cooking compartment than a central area of the cooking compartment.

5. The oven of claim 1, wherein the camera is mounted to outside the door inclinedly and captures an image of the inside of the cooking compartment.

6. The oven of claim 1, wherein the controller is electrically connected to the camera and the communicator through wires.

7. The oven of claim 1, further comprising a display which comprises a cooking-start button,
   wherein the controller controls the camera to be operated corresponding to reception of user input for selecting the cooking-start button.

8. The oven of claim 7, further comprising a light configured to provide additional light,
   wherein the controller controls the light to be operated corresponding to operation of the camera.

9. The oven of claim 7, wherein the controller is configured to transmit first control information corresponding to reception of user input for selecting the cooking-start button, to the portable device through the communicator.

10. The oven of claim 1, wherein the controller is configured to transmit second control information corresponding to completion of cooking of the foodstuff to the portable device through the communicator.

11. The oven of claim 10, wherein the controller controls the door operator to open the door according to third control information received from the portable device in response to the transmitted second control information.

12. The oven of claim 11, further comprising a door opening or closing sensor,
   wherein the controller is configured to detect an opening of the door corresponding to the third control information using the door opening or closing sensor.

13. The oven of claim 11, wherein when opening of the door is detected, the controller controls the camera to stop image-capturing.

14. The oven of claim 13, wherein the controller is configured to transmit fourth control information corresponding to the opening of the door to the portable device through the communicator.

15. The oven of claim 14, wherein the controller is configured to transmit fifth control information corresponding to completion of discharging high-temperature heat housed in the cooking compartment by the opening of the door, to the portable device through the communicator.

16. The oven of claim 1, wherein the controller controls the door operator to open the door to a selected angle to discharge high-temperature air inside the cooking compartment for a selected period of time after a cooking is completed, and to close the door after the selected period of time is reached.

17. The oven of claim 1, wherein the door operator comprises a motor and a door opener operated by the motor, and wherein the door opener is configured to move the door from a close position to an open position with a selected angle by contacting the door, and to be separated from the door to close the door by a weight of the door.

18. The oven of claim 1, wherein the door operator is controllable by a remote control so that the door is configured to open or close by the remote control.

* * * * *